US012597237B2

(12) United States Patent
Shintani et al.

(10) Patent No.: US 12,597,237 B2
(45) Date of Patent: Apr. 7, 2026

(54) INFERENCE LEARNING DEVICE AND INFERENCE LEARNING METHOD

(71) Applicant: OLYMPUS CORPORATION, Tokyo (JP)

(72) Inventors: Koichi Shintani, Hachioji (JP); Akira Tani, Sagamihara (JP); Manabu Ichikawa, Hachioji (JP); Kensei Ito, Hachioji (JP); Tomoko Gocho, Hino (JP); Osamu Nonaka, Sagamihara (JP)

(73) Assignee: OLYMPUS CORPORATION, Tokyo (JP)

( * ) Notice: Subject to any disclaimer, the term of this patent is extended or adjusted under 35 U.S.C. 154(b) by 324 days.

(21) Appl. No.: 18/236,867

(22) Filed: Aug. 22, 2023

(65) Prior Publication Data

US 2023/0394800 A1 Dec. 7, 2023

Related U.S. Application Data

(63) Continuation of application No. PCT/JP2021/008988, filed on Mar. 8, 2021.

(51) Int. Cl.
*G06V 10/774* (2022.01)
*G06T 7/00* (2017.01)

(52) U.S. Cl.
CPC .......... *G06V 10/774* (2022.01); *G06T 7/0012* (2013.01)

(58) Field of Classification Search
None
See application file for complete search history.

(56) References Cited

U.S. PATENT DOCUMENTS

| | | | |
|---|---|---|---|
| 12,137,879 B2 * | 11/2024 | Ichikawa | ............... G06N 3/045 |
| 2019/0138806 A1 | 5/2019 | Banerjee et al. | |
| 2019/0253615 A1 * | 8/2019 | Fukuya | .................. G10L 15/22 |
| 2020/0242154 A1 * | 7/2020 | Haneda | ................. G06F 16/535 |
| 2021/0350909 A1 | 11/2021 | Saxena et al. | |
| 2022/0035874 A1 * | 2/2022 | Shintani | ............. G06F 16/9537 |
| 2022/0361739 A1 * | 11/2022 | Ichikawa | ............. G06N 3/0464 |

FOREIGN PATENT DOCUMENTS

| | | |
|---|---|---|
| JP | 2019-087221 A | 6/2019 |
| JP | 2020-123174 A | 8/2020 |
| WO | 2020/153493 A1 | 7/2020 |

OTHER PUBLICATIONS

International Search Report dated May 21, 2021 received in PCT/JP2021/008988.

* cited by examiner

*Primary Examiner* — Tsung Yin Tsai

(74) *Attorney, Agent, or Firm* — Scully, Scott, Murphy & Presser, P.C.

(57) ABSTRACT

An inference learning device, comprising an input device for inputting data from a data acquisition device, a learning device for obtaining an inference model by learning using training data that has been obtained by performing annotation of the data, and a data processing device that, for data that has been obtained continuously in time series from the data acquisition device, makes provisional training data by performing the annotation on a plurality of items of data that have been obtained from data that was obtained at a given first time to a second time that has been traced back to a predetermined time, and makes data, among the provisional training data that has a high correlation of causal relationship with the data of the first time, into adopted training data, which is training data used in the learning device.

15 Claims, 9 Drawing Sheets

Figure 9:
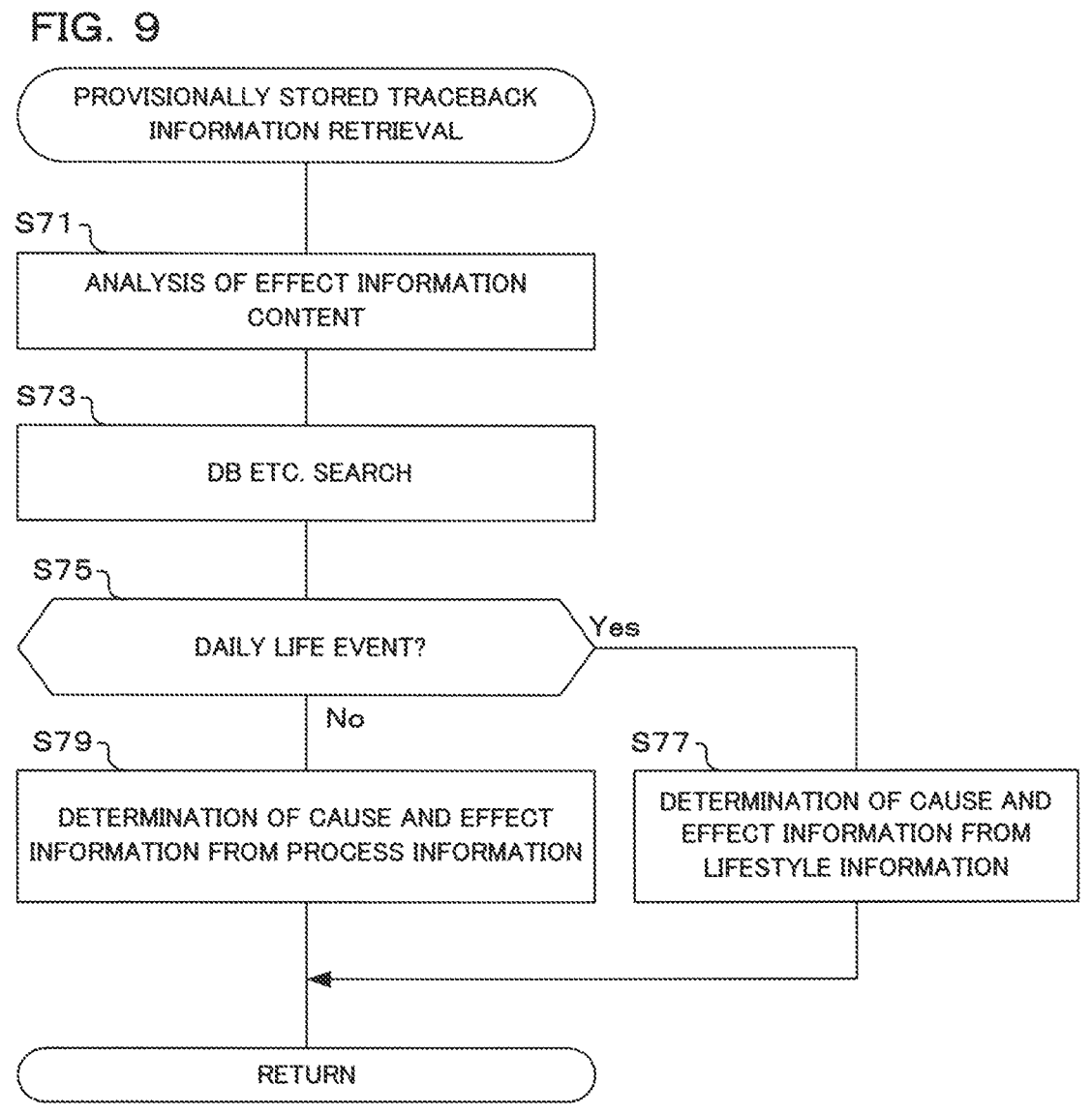

PROVISIONALLY STORED TRACEBACK
INFORMATION RETRIEVAL

S71

ANALYSIS OF EFFECT INFORMATION
CONTENT

S73

DB ETC. SEARCH

S75

DAILY LIFE EVENT?  Yes

No

S79

DETERMINATION OF CAUSE AND EFFECT
INFORMATION FROM PROCESS INFORMATION

S77

DETERMINATION OF CAUSE AND
EFFECT INFORMATION FROM
LIFESTYLE INFORMATION

RETURN

INFERENCE LEARNING DEVICE AND INFERENCE LEARNING METHOD

CROSS-REFERENCE TO RELATED APPLICATIONS

This application is a Continuation application of PCT Application No. PCT/JP2021/008988, filed on Mar. 8, 2021, the entire contents of all of which are incorporated herein by reference. The scope of the present invention is not limited to any requirements of the specific embodiments described in the application.

BACKGROUND OF THE INVENTION

1. Field of the Invention

The present invention relates to an inference learning device and an inference learning method for inference for inference model generation, that are capable of organizing causal relationships for change in physical object, using time series data of a physical object, and predicting the future based on this causal relationship.

2. Description of the Related Art

In order to predict device faults, it has been proposed to perform causal relationship analysis of signal data, using a machine learning model. Refer, for example, to Japanese patent laid-open No. 2019-087221 (hereafter referred to as patent publication 1).

The signal analysis system of previously described patent publication 1 is input with raw signal data, there is trace back to the signal data for feature origins, and feature values are mapped onto regions and applied knowledge. With this structure, a sensor data analysis process is automated, and it is possible to perform causal relationship analysis for the purpose of fault prediction. However, there is no means of guiding the user's actions.

SUMMARY OF THE INVENTION

The present invention provides an inference learning device and an inference learning method that are capable of generating training data taking into consideration causal relationships within time series data, in order to guide user actions.

An inference learning device of a first aspect of the present invention comprises an input device for inputting data from a data acquisition device, a learning device for obtaining an inference model by learning using training data that has been obtained by performing annotation of the data, and a data processing device that, for data that has been obtained continuously in time series from the data acquisition device, makes provisional training data by performing the annotation on a plurality of items of data that have been obtained from data that was obtained at a given first time to a second time that has been traced back to a predetermined time, and makes data, among the provisional training data that has a high correlation of causal relationship with the data of the first time, into adopted training data, which is training data used in the learning device.

An inference learning device of a second aspect of the present invention comprises an input device for inputting information data from an information acquisition device, a learning device for obtaining an inference model by learning using training data that has been obtained by performing annotation of the information data, and a data processing device that, for information data that has been obtained continuously in time series from the information acquisition device, makes provisional training data by performing the annotation on a plurality of items of data that have been acquired from data that was acquired at a given first time to a second time traced back to a predetermined time, and makes data, among the provisional training data, that has a high correlation of causal relationship with the data of the first time, into adopted training data, which is training data used in the learning device.

An inference learning method of a third aspect of the present invention comprises inputting data from a data acquisition device, for data that has been obtained continuously in time series from the data acquisition device, making provisional training data by performing the annotation on a plurality of items of data that have been acquired from data that was acquired at a given first time to a second time traced back to a predetermined time, making data, among the provisional training data that has a high correlation of causal relationship with the images of the first time, into adopted training data, and obtaining an inference model by learning using the adopted training data.

BRIEF DESCRIPTION OF THE DRAWINGS

FIG. 2A and FIG. 2B are drawings showing examples of performing guidance display using an inference model, in the inference learning device of one embodiment of the present invention.

FIG. 9 is a flowchart showing operation of provisional storage traceback information retrieval, in the inference learning device of one embodiment of the present invention.

DETAILED DESCRIPTION OF THE PREFERRED EMBODIMENTS

Figure 1:
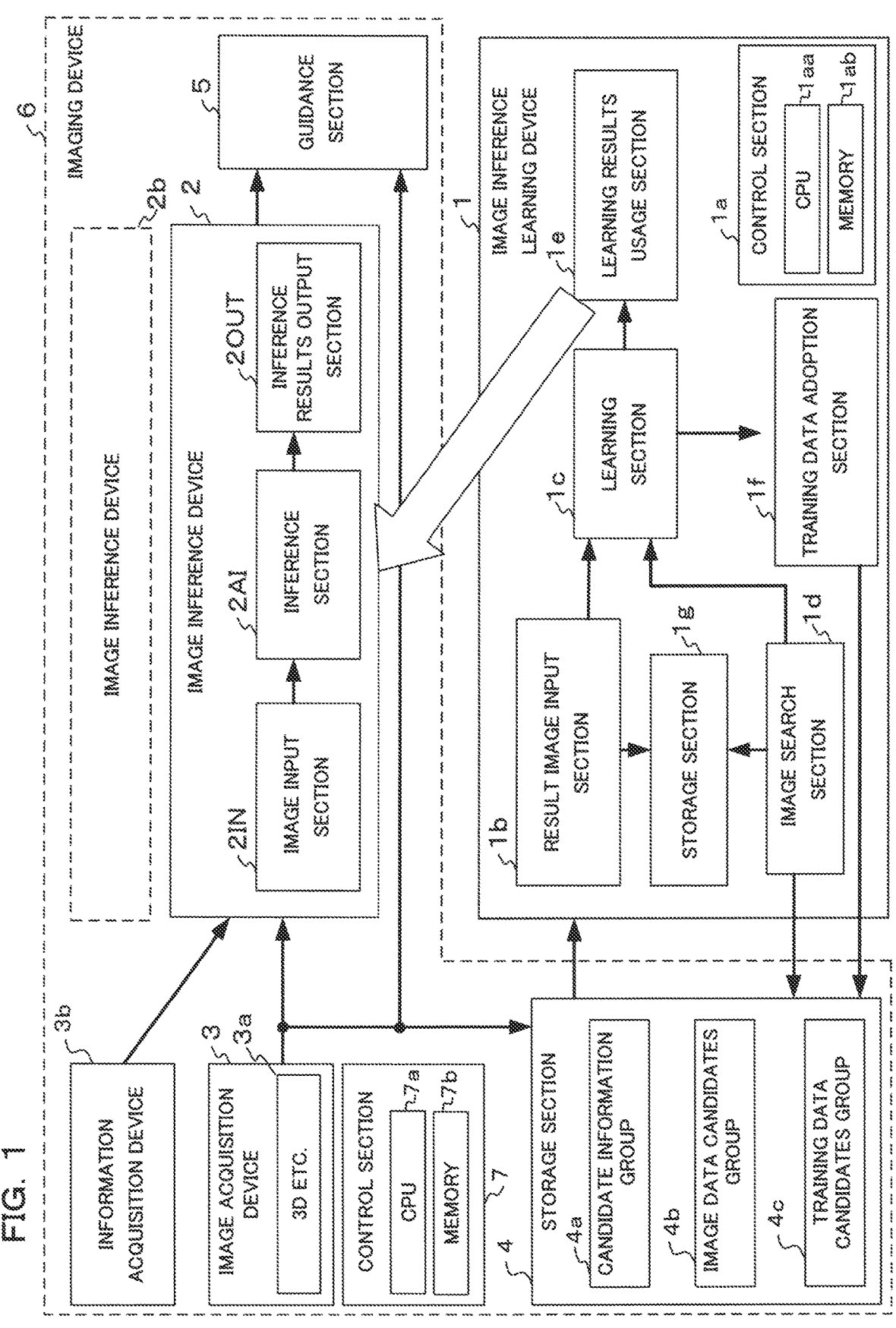
FIG. 1 is a block diagram mainly showing the electrical structure of an inference learning device of one embodiment of the present invention.

An inference learning device of one embodiment of the present invention is input with time series data such as image data, organizes data so as to understand causal relationships of items, and uses this data when predicting the future using artificial intelligence (AI). When items change, there are causal relationships, and before an item is changed particular actions and phenomena constitute causes, and these actions and phenomena can be confirmed. When these types of actions and phenomena have been detected (confirmed), it is convenient to be able to use AI, such as issuing guidance such as warnings etc.

In order to use this type of AI, it is necessary to have an inference model for that purpose. Then, if there is an outcome that arises after having performed diagnosis and treatment etc., the inference learning device of this embodiment traces back time series data and finds a cause that resulted in this outcome arising. Then, relationships between this cause and effect, namely a causal relationship, are organized, and training data is generated by performing annotation of this causal relationship in data. An inference model is generated by performing machine learning, such as deep learning, using this training data that has been generated. This inference model is set in an inference engine, and it becomes possible to issue guidance such as described above by inputting new data (refer, for example, to FIG. 2A and FIG. 2B).

An example where the present invention has been applied to an image inference learning system will be described as one embodiment of the present invention. The image inference learning system shown in FIG. 1 comprises an image inference learning device 1 and an imaging device 6.

The image inference learning device 1 may be a device such as a stand-alone computer, or may be arranged within a server. In a case where the image inference learning device 1 is a stand-alone computer or the like, it is desirable to be able to connect the imaging device 6 in a wired or wireless manner. Also, in the event that the image inference learning device 1 is arranged within a server, it is desirable to be able to connect to the imaging device 6 by means of am information communication network such as the Internet.

Also, the imaging device 6 may be a device is provided in a medical appliance such as an endoscope and that photographs imaging objects such as affected parts, may be a device that is provided in a scientific device such as a microscope and that photographs imaging objects such as cells, and may be a device whose main purpose is to capture images, such as a digital camera. In any event, in this embodiment the imaging device 6 may be a device whose main function is an imaging function, or may be a device that is for executing other main functions, and also has an imaging function.

An image inference device 2, image inference device 2b, image acquisition device 3, information acquisition device 3b, memory 4, guidance section 5, and control section 7 are provided within the imaging device 6. It should be noted that the imaging device 6 shown in FIG. 1 will be described for an example where the various devices described above are integrated. However, it is also possible to have a structure where the various devices may be arranged separately, and connected using an information communication network such as the Internet, or a dedicate communication network. The memory 4 may be formed separately to the imaging device 6, and connected using the Internet or the like. Also, in FIG. 1, although not illustrated, various members, circuits, and devices are provided in order to make the imaging device 6 function, such as an operation section (input interface), communication section (communication circuit), etc.

The image acquisition device 3 has an optical lens, image sensor, imaging control circuit, and various imaging circuits such as an imaging signal processing circuit, and acquires and outputs image data for physical objects. It should be noted that for the purposes of imaging there may also be an exposure control member (for example, a shutter and aperture), and an exposure control circuit, and for the purpose of performing focusing of the optical lens there may be a lens drive device, a focus detection circuit, and focus adjustment circuit etc. Further, the optical lens may be a zoom lens. The image acquisition section 3 functions as an image acquisition section (image acquisition device) that acquires image data in time series (refer, for example, to S21 in FIG. 5).

A range (distribution) detection function (3D) etc. 3a may be arranged within the image acquisition device 3. The 3D etc. 3a images a physical object in three dimensions, and acquires three dimensional image data etc., but besides three dimensional images it is also possible to acquire depth information by acquiring reflected light and ultrasonic waves etc. Three dimensional image data can be used when detecting position of a physical object within a space, such as depth of a physical object from the image acquisition device 3. For example, if the imaging device 6 is an endoscope, when a physician performs an operation to insert the endoscope into a body, if the imaging section has a 3D function it is possible to grasp a positional relationship between locations within the body and the device, it is also possible to grasp the three dimensional shape of the location, and it becomes possible to give a three dimensional display. Also, strictly speaking, even if depth information is not acquired, it is possible to calculate depth information from a relationship between a background and size of an object in front.

The information acquisition device 3b may also be arranged within the imaging device 6. Without being limited to image data, the information acquisition device 3b may also obtain information relating to a physical object, for example, accessing an electronic medical chart and obtaining information relating to a patient and obtaining information relating to devices that have been used in diagnosis and treatment from the electronic health chart. For example, in the case of treatment where a physician uses an endoscope, the information acquisition device 3b may obtain information such as the name and gender of the patient, and information such as locations within the body where the endoscope has been inserted. Also, the information acquisition device 3b may acquire audio data for at the time of diagnosis and treatment, and may acquire medical data, for example, body temperature data, blood pressure data, heart rate data etc., as well as information from an electronic medical chart. Obviously, it is also possible to substitute terminal applications such as report systems used by physicians instead of electronic medical charts. Further, the information acquisition device 3b may also acquire such information data relating to daily life as might be associated with life style related diseases.

The memory 4 is an electrically rewritable non-volatile memory for storing image data that has been output from the image acquisition device 3 and the information acquisition device 3b, and various information data. Various data that has been stored in the memory 4 is output to the image inference learning device 1, and data that has been generated in the image inference learning device 1 is input and stored. The memory 4 stores a candidate information group 4a, an image data candidate group 4b, and a training data candidate group 4c.

The candidate information group 4a is information that has been acquired from the information acquisition device 3b, and all information is temporarily stored at the time of acquisition. This candidate information group 4a is associated with image data that has been stored in the image data candidate group 4b. The candidate information group 4a is, for example, shooting time, shooting photographer name, affected area location, type of unit used, name of device, etc.

for various image data stored in the image data candidate group 4b. The image data candidate group 4b is image data that was acquired by the image acquisition device 3 and stored in time series. Image data that has been acquired by the image acquisition device 3 is all stored temporarily in this image data candidate group 4b. As will be described later, in the case where an event has occurred, a corresponding image data candidate group 4b is transferred to a training data candidate group 4c, but image data candidate groups 4b other than this are appropriately deleted.

The training data candidate group 4c is data constituting candidates when creating training data. As will be described later, trigger information is outputted if an event arises, during acquisition of images by the imaging device 6 (refer to S27 in FIG. 5), and in this case image data that was stored at a predetermined time is traced back, and the training data candidate group 4c is generated by attaching information such as metadata to this image data that has been created by tracing back. In creating this training data candidate group 4c, information may also be added using the candidate information group 4a. The memory 4 that has the training data candidate group 4c functions as an output section (output device) for outputting image data to which metadata has been added to the inference learning device (refer to S35 in FIG. 5).

The image inference device 2 is input with image data etc. that has been acquired by the image acquisition device 3, performs inference using an inference model that has been generated by the image inference learning device 1, and outputs guidance display to the guidance section 5 based on the results of the inference results. The image inference device 2 has an image input section 2IN, an inference section 2AI, and an inference results output section 2OUT. The image inference device 2b has the same structure as the image inference device 2, and it is possible to perform a plurality of inferences at the same time. Image inference devices 2b may be added in accordance with the number of required inferences, or may be omitted, as required.

The image input section 2IN is input with image data that has been output by the image acquisition device 3, and/or information that has been output by the information acquisition device 3b. These items of data (information) are time series data (information) formed from a plurality of image frames, and are successively input to the image input section 2IN. There may be only a single image input section 2IN, provided it is possible to detect information on both causes and effects in the same range of images. However, this is not limiting, and it is also possible for an image input section that detects causes and an image input section that detects effects to be provided separately. However, in this case it is preferable to have a scheme that attempts to avoid incorrectly determining completely separate phenomena as having correlation. For example, as a system in which a plurality of input sections (input devices) (or acquisition sections (acquisition devices)) that have a possibility of being related have been associated in advance, correlation may be determined in that range. Also, with respect to specified phenomena, retrieval may be performed on the assumption that these input sections (acquisition sections) are associated, by setting information possessed by associated units and devices, or by detecting data possessed (stored in) that target unit or device.

Also, information that is not images, such as data etc. that can be obtained by audio and other sensors, may also be referenced as required. Also, without being limited to an image input section (image input device), data may be obtained using a data input section (data input device). Also, images input to the input section may be input one frame, of images that can be obtained continuously, at a time, and a plurality of frames may be collected together. Inputting a plurality of frames makes it possible to know a time difference between each frame, making it possible to obtain new information called image change. Such type of learning may be performed in a case where an inference engine that performs inference with a plurality of frames is assumed.

The inference section 2AI has an inference engine, and an inference model that has been generated by the image inference learning device 1 is set in this inference engine. The inference engine has a neural network, similarly to the learning section 1c which will be described later, and an inference model is set in this neural network. The inference section 2AI inputs image data that has been input by the image input section 2IN to an input layer of the inference engine, and performs inference in intermediate layers of the inference engine. The inference results are output by the inference results output section 2OUT to the guidance section 5. In this way, while inputting images, the images are reproduced in substantially real time, and if guidance is displayed by attaching to those images while the user is observing identifiable reproduced images, it becomes possible to deal with a condition where that time is ongoing. Inference from these images is also not necessarily limited to inference that uses individual image frames, and determination may also be performed by inputting a plurality of images.

The guidance section 5 has a display etc., and displays images of physical objects that have been acquired by the image acquisition device 3. Also, guidance display is performed on the basis of inference results that have been output by the inference results output section 2OUT.

The control section 7 is a processor having a CPU (Central Processing Unit) 7a, memory 7b, and peripheral circuits. The control section 7 controls each device and each section within the imaging device 6 in accordance with programs stored in the memory 7b. The control section 7 functions as a metadata assignment section that, when an event has occurred during acquisition of time series image data (refer to S27 in FIG. 5), traces back to a time when a cause of the event arose, and attaches metadata showing causal relationships to the image data (refer, for example, to FIG. 2A, FIG. 2B, INGA_METADATA in FIG. 4, and S29 in FIG. 6).

The image inference learning device 1 generates an inference model by performing machine learning (including deep learning) using image data that has been acquired by the image acquisition device 3 and various data that has been acquired by the information acquisition device 3b. The image inference learning device 1 has a result image input section 1b, a learning section 1c, image retrieval section 1d, learning results utilization section 1e, training data adoption section 1f, and storage section 1g.

The result image input section 1b is input with a training data candidate group 4c stored in the memory 4, that was acquired by the image acquisition device 3. At this time, for example, in a case where treatment have been carried out with an endoscope, the candidate information group 4a may be input with information such as shooting time, name of person performing treatment (subject photographer), affected part and location, treatment device etc. Also, at time T1a and T1b, information such as bleeding has spread or bleeding has reduced may also be input. It should be noted that in this embodiment determination such as bleeding has spread or bleeding has reduced is performed in the imaging device 6 (refer to S27 in FIG. 5). However, this determination may also be performed in the control section 1*a* of the image inference learning device 1. Specifically, spreading and reduction in bleeding can be determined using change in color, shape and extent of blood within a screen, and it is also possible to detect spreading and reduction in bleeding using inference or a logic base.

Image data candidates etc. that have been input by the result image input section 1*b* are output to the storage section 1*g* and the learning section 1*c*. Learning is not limited to image data, and it is also possible to use data other than images, that has been acquired by the information acquisition device 3*b*. Further, it is also possible to collect the image data candidate group 4*b* and store in the storage section 1*g*.

Figures 2A, 2B:
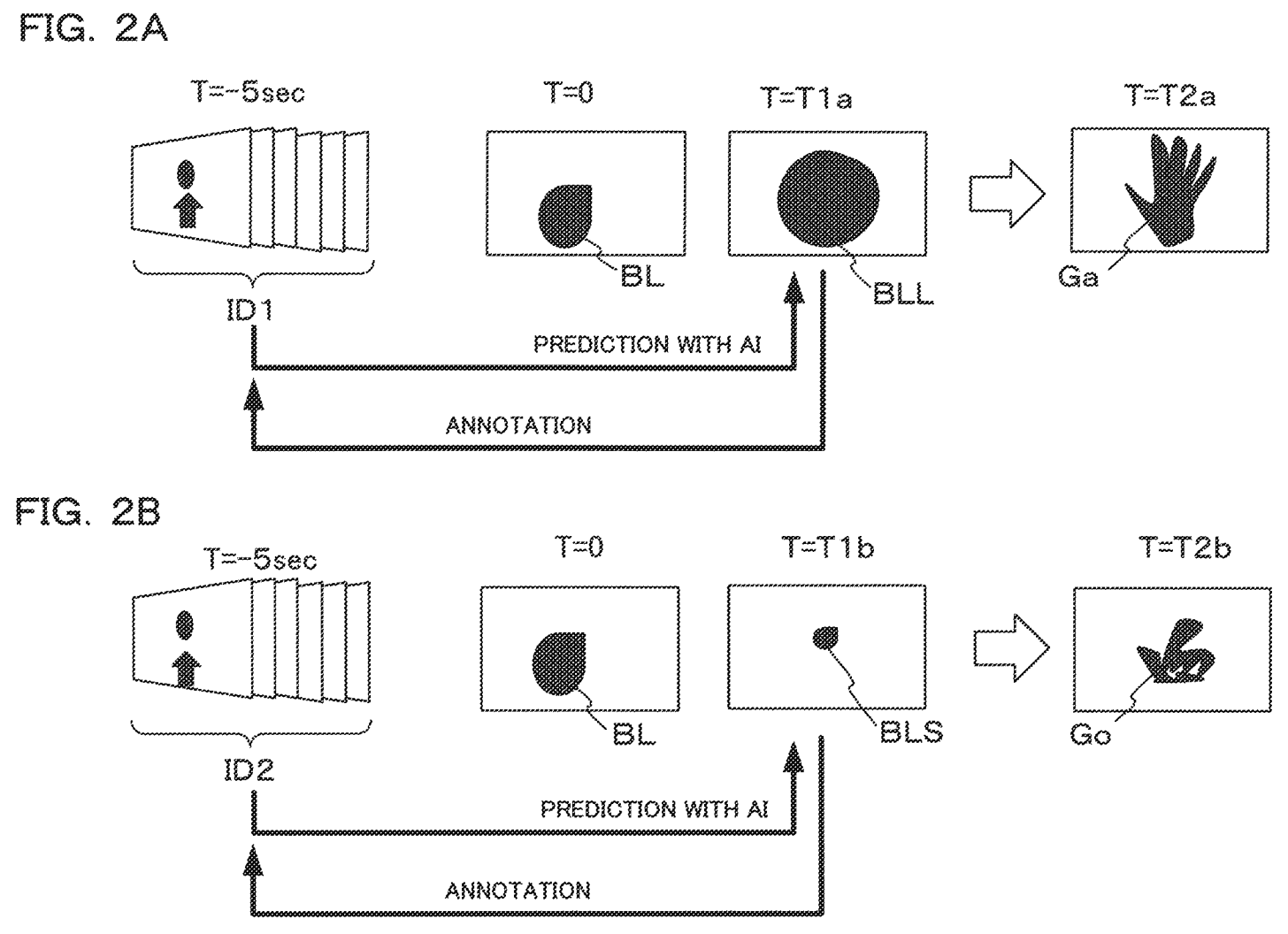
Figure 3:
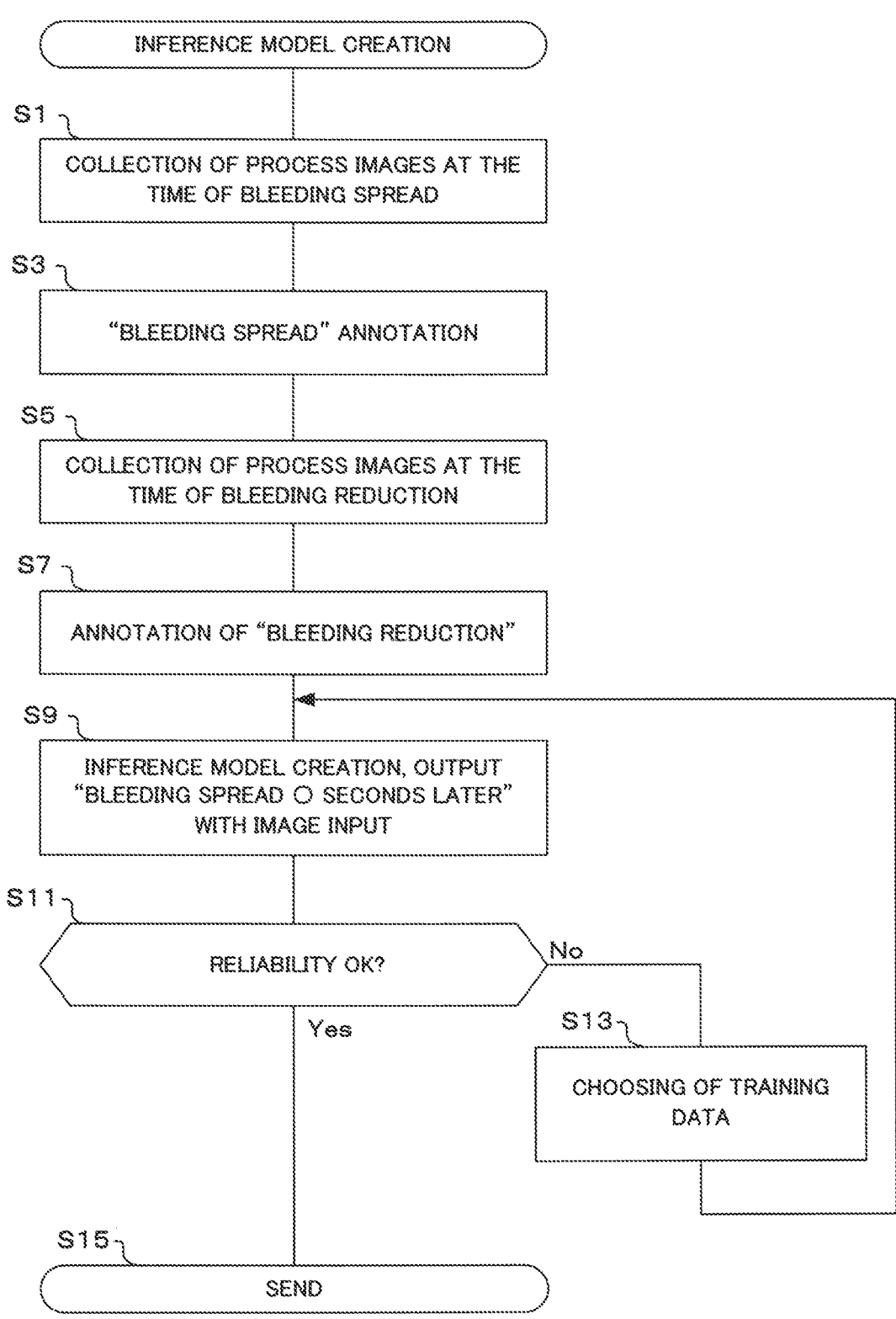
FIG. 3 is a flowchart showing operation of inference model generation, in the inference learning device of one embodiment of the present invention.
Figure 6:
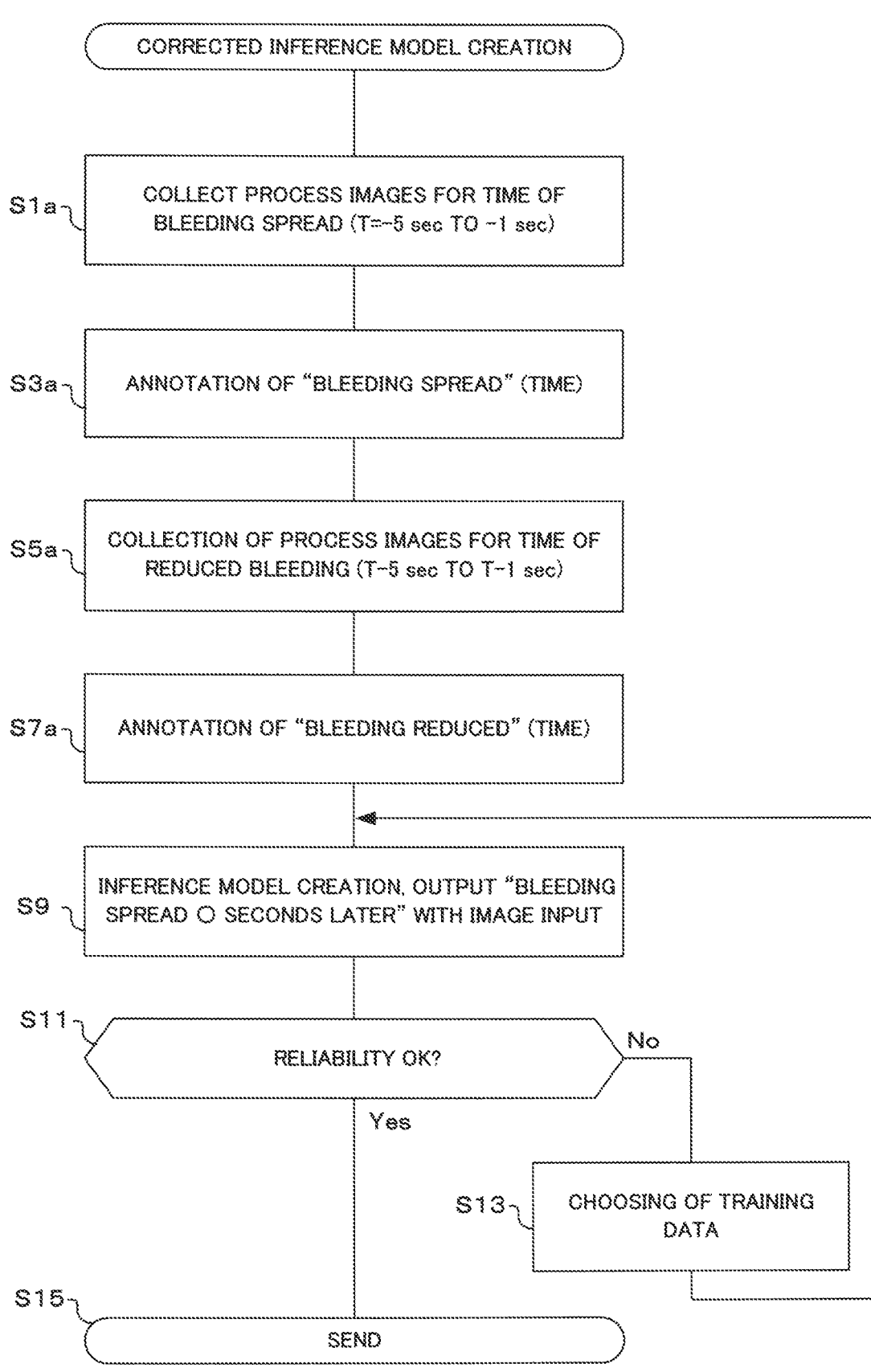
FIG. 6 is a flowchart showing operation of corrected inference model generation, in the inference learning device of one embodiment of the present invention.

The result image input section 1*b* functions as an input section (input device) that inputs image data from the image acquisition device (refer, for example, to S1 and S5 in FIG. 3, and S1*a* and S5*a* in FIG. 6). The input section (input device) also inputs traced back time information in addition to image data or instead of image data (refer, for example, to T=−5 sec in FIG. 2A and FIG. 2B). Metadata showing that there is data having a possibility of data being associated with causes or effect is attached to data input by the input section (input device), meta data capable of being attributed to a cause is attached to data representing some cause, or metadata is attached to possible effect data that has resulted from some cause (refer, for example, to INGA_META-DATA in FIG. 4). Data input by the input section is cause data and effect data (refer, for example, to IN_Possible and GA_possible in FIG. 4. Here, description has been given for handling a single frame of image data, but a plurality of frames can be handled and speed of change etc. may be detected using time difference between each frame, and the results of this detection etc. may be added.

The result image input section 1*b* also inputs data other than image data. For example, it is possible to input information that has been acquired by the information acquisition device 3*b* of the imaging device 6. The result image input section 1*b* functions as an input section (input device) that inputs information data from the information acquisition device.

The storage section 1*g* is an electrically rewritable non-volatile memory, stores the training data candidate group 4*c* etc. that has been input by the result image input section 1*b*, and may further store the candidate information group 4*a* in association with the image data candidate group 4*b* and image data etc. The image inference learning device 1 is connected to many imaging devices 6, and it is possible to collect data such as training data candidate groups 4*c* from respective imaging devices 6. The storage section 1*g* can store, for example, data that has been collected from many imaging devices 6.

It should be noted that the inference learning device of this embodiment is also used for the application of learning by collecting data (not limited to image data) for the same conditions from the same imaging device. This inference learning device comprises an input section for inputting data in time series (so as to know time relationships before and after a time, and what a time difference is between items of data), and a learning section for generating training data that has been obtained by performing annotation on this data, and obtaining an inference model for guidance by learning using this training data. Also, for data that has been obtained continuously in time series, this inference learning device obtains provisional training data by performing annotation on a plurality of items of data that have been obtained up to a time that has been traced back from a specified time. It should be noted that the provisional training data may be handled as a single frame of consecutive image data (frames), and may be handled as a single item of data by collecting a plurality of frames together.

The image retrieval section 1*d* retrieves data constituting candidates for training data at the time of inference learning, from among image data that was input in the result image input section 1*b* and stored in the storage section 1*g*, and outputs retrieval results to the learning section 1*c*. It should be noted that the image retrieval section 1*d* is not limited to images that have been input by the result image input section 1*b*, and images that have been uploaded on the Internet etc., or images (or data) that have been obtained using other than the image acquisition device 3, such as a specified terminal, may also be retrieved.

In the above description, for data that has been acquired continuously in time series, the learning section obtains provisional training data by performing annotation on a plurality of items of data that have been acquired up to a time (second time) that has been traced back from data that was obtained at a specified time (first time). In this case, for the second time, an image processing section (image processing device) may determine time to trace back to the second time, in accordance with phenomena that can be determined from images at the first time. This is because classification, such as whether things that constitute causes are close, or a long time before etc., is possible in accordance with events that have occurred, and this makes it possible to obtain the advantage of omitting retrieval and storage of unnecessary data by adopting this method, time advantages and simplification of the system structure, and increase in storage capacity.

The learning section 1*c* is provided with the inference engine similarly to the inference section 2A1, and generates inference models. The learning section 1*c* generates an inference model by machine learning, such as deep learning, using image data that has been input by the result image input section 1*b* and image data that has been retrieved by the image retrieval section 1*d*. Deep learning will be described later. The learning section 1*c* functions as a learning section (inference engine) that obtains an inference model for guidance by learning using training data that has been obtained by performing annotation of image data (refer, for example, to FIGS. 3 and S9 in FIG. 6). The inference model for guidance receives image data as input, and it is made possible to output guidance information capable of displaying guidance at the time of displaying this image data. Also, the learning section 1*c* functions as a learning section (inference engine) that obtains an inference model by learning using training data that has been obtained by performing annotation on image data and/or data other than images.

The learning section 1*c* finally generates an inference model using training data that has been adopted by a training data adoption section 1*f*, which will be described later. Also, the training data that has been adopted by the training data adoption section 1*f* is stored as the training data candidate group 4*c* of the memory 4. Also, the training data adoption section 1*f* has a memory, and the training data that has been adopted may be stored in this memory, and may be stored in a storage section 1*g*.

The training data adoption section 1*f* determines reliability of the inference model that has been generated in the learning section 1*c*, and determines whether or not to adopt as training data based on the result of this determination. Specifically, if reliability is low, training data used when generating an inference model is not adopted, and only training data in the case of high reliability is adopted. At this time, it is not necessary to perform determination simply in image units, and images may be handled collectively, such as, for example, making a plurality of adjacent images into an image pair. This is because it is also possible to determine causes etc. arising due to image changes or trends of changes (such as direction and speed, within two dimensions, including the depth direction, which is a direction orthogonal to these dimensions) within images being combined, from differences in adjacent images. Also, this plurality of adjacent images may be images obtained a specified time width apart, and are not necessarily images for aligned (temporally continuous) frames. That is, in this case, an image processing section may collect together a plurality of images that have been obtained over the course of a specified time difference, and attach metadata showing information relating to image data that was obtained at a first time to adopted training data, then set change information obtained from images of a time difference as information at the time of inference.

The training data adoption section if functions as an image processing section (image processing device) that, in cooperation with the control section 1a, for image data that has been obtained continuously in time series from the image acquisition device, creates training data by performing annotation in image data from a time that has been traced back from a specified time (as described previously, this may be individual image frames obtained consecutively, or handled by collecting together a plurality of frames) (refer, for example, to FIG. 2A, FIG. 2B, FIG. 3, and to S3, S3a, S7, S7a, S11 and S13 in FIG. 6). The image processing section (image processing device) determines a time to be traced back to a second time in accordance with events that can be determined from images at a first time (refer, for example, to S29 in FIG. 5). There are a plurality of images including the time traced back to, and the image processing section (image processing device) adopts images among those plurality of images that have a high correlation of causal relationship as training data (refer, for example, to FIG. 3 and S11 and S13 in FIG. 6).

Figure 4:
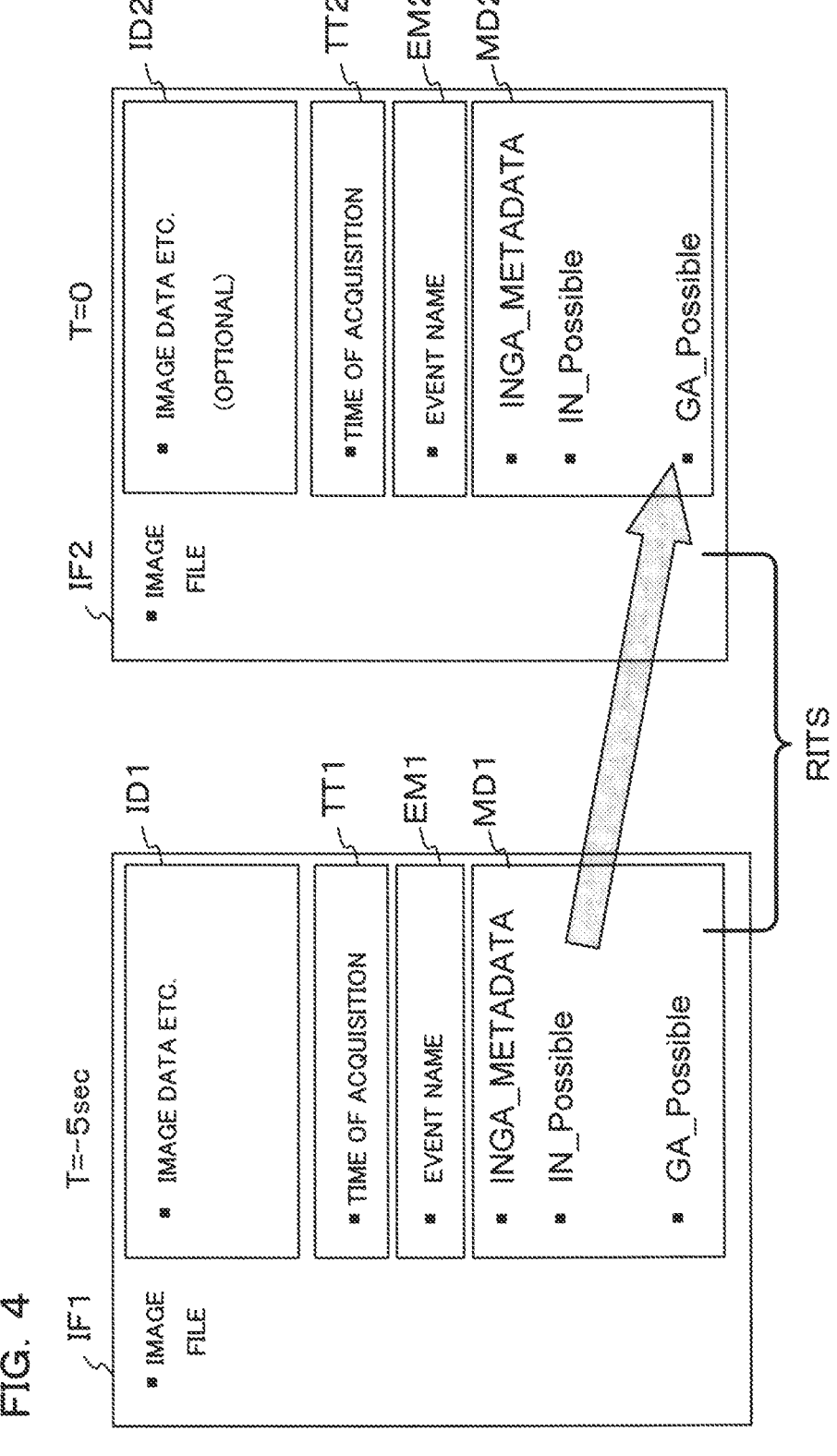
FIG. 4 is a drawing showing the structure of an image file, in the inference learning device of one embodiment of the present invention.
Figure 7:
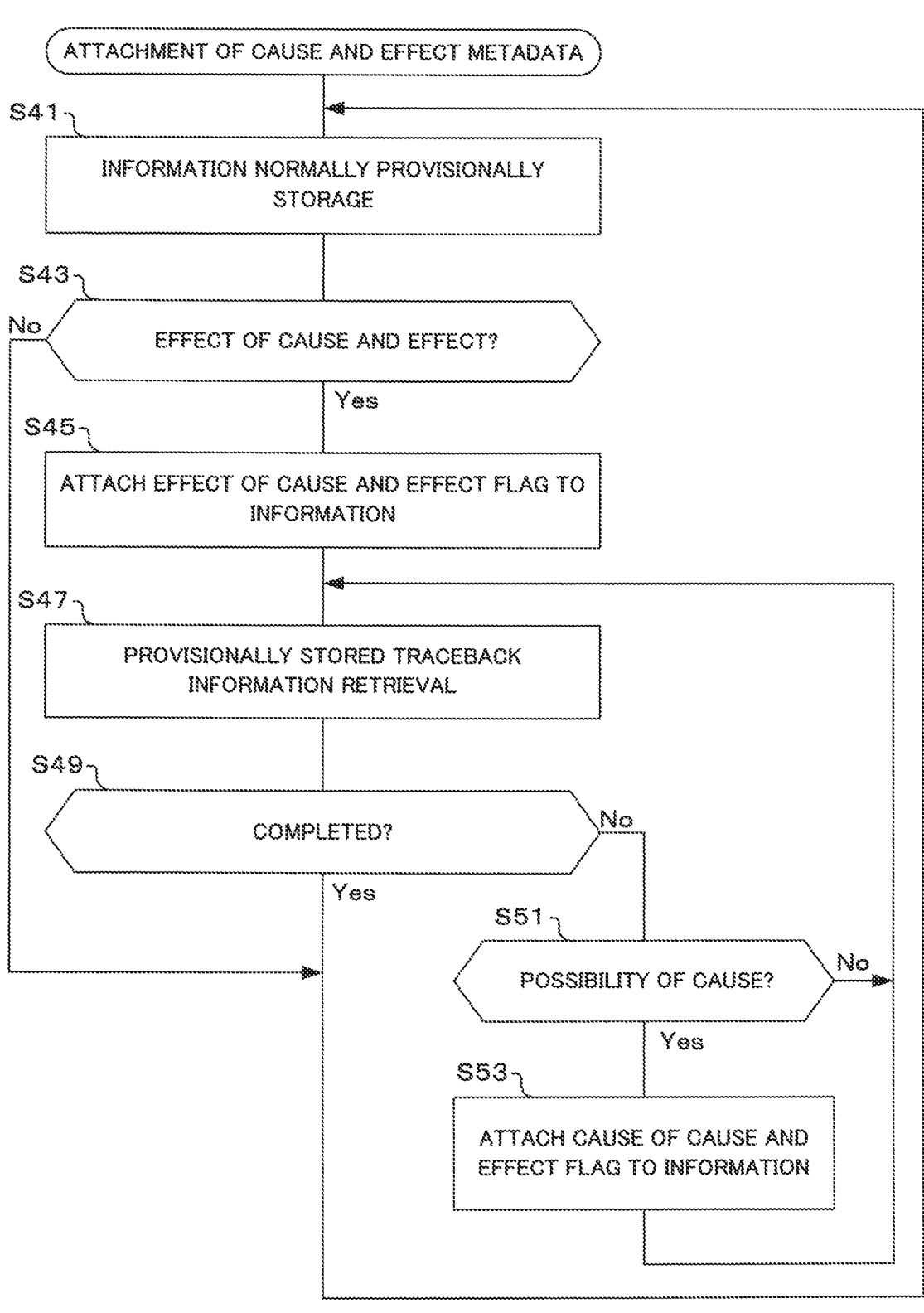
FIG. 7 is a flowchart showing operation of cause and effect metadata attachment, in the inference learning device of one embodiment of the present invention.
Figure 8:
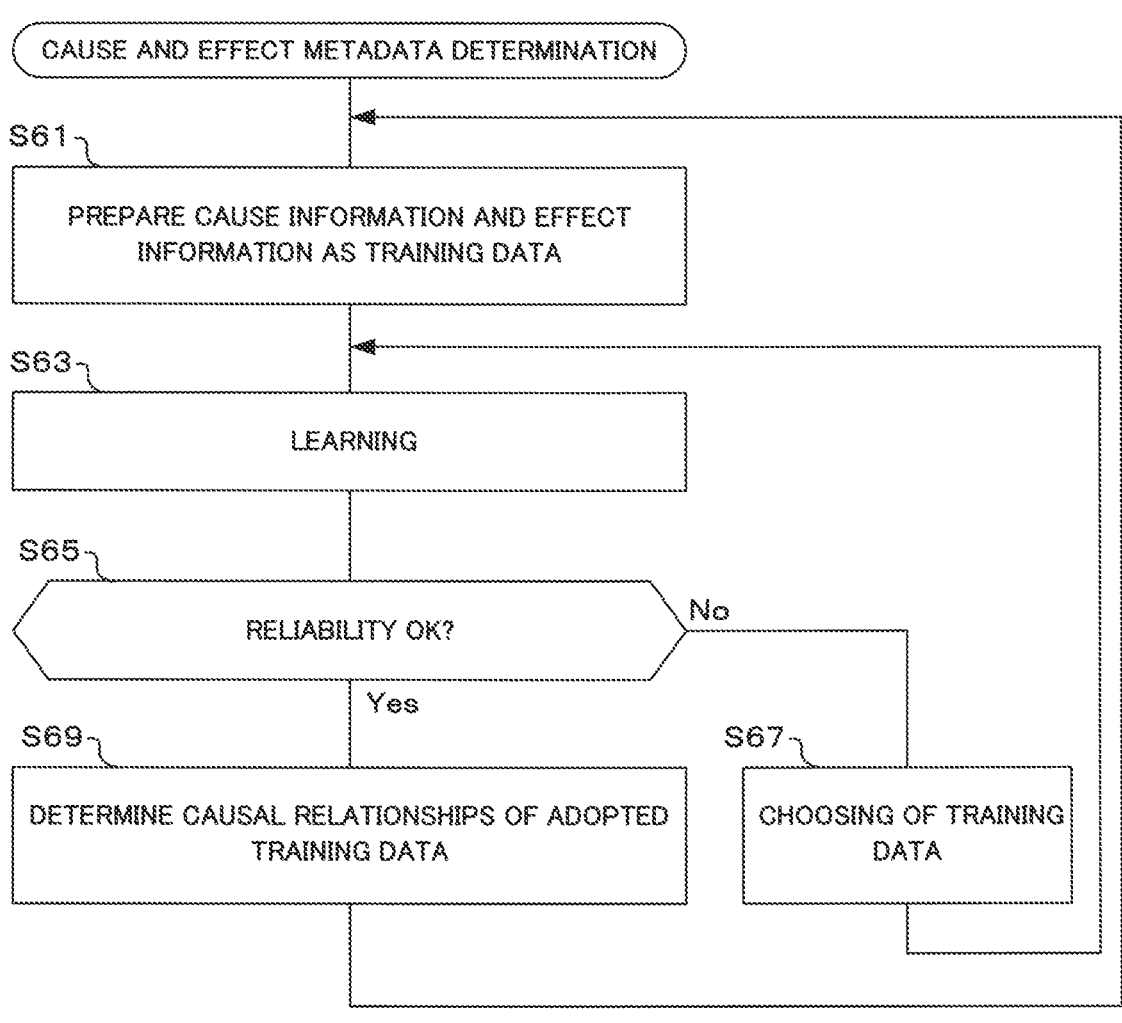
FIG. 8 is a flowchart showing operation of cause and effect metadata determination, in the inference learning device of one embodiment of the present invention.

Metadata showing information (may be just an event name) relating to image data that has been obtained at the first time is attached to the adopted training data (refer, for example, to FIG. 4, FIG. 7, and FIG. 8). Also, the image processing section (image processing device) may collect together a plurality of images that have been obtained over the course of a specified time difference and attach metadata showing information relating to image data that was obtained at the first time to the adopted training data, and also set change information of images of a time difference as information at the time of inference.

The image processing section (image processing device) changes the annotation on the basis of image appearance change (for example, expansion or reduction of bleeding, subject deformation, object intruding from outside a screen) at a time that continues from the first time (for example, a time of bleeding or the like). The image processing section (image processing device) performs annotation on image data obtained by forming composites of a plurality of image data obtained up to a second time (for example, not only image data at the time of panorama shooting, but images for high resolution processing using a plurality of images, and images for removal of mist, smoke and fog using a plurality of items of information). The images for removal of mist, smoke and fog described above are generated at the time of using electrosurgical knives when performing operations, and when carrying out cleaning etc.

The image processing section (image processing device) sets cause data and effect data as training data candidates, creates an inference model using these training data candidates, and if reliability of the inference model that has been created is high determines these relationships to be causal relationships (refer, for example, to FIG. 8). The image processing section (image processing device) performs annotation on data according to reaction rate of a body based on image data, and creates training data (refer, for example, to FIG. 2A and FIG. 2B). As reaction rate of a body, there is, for example, rate at the time of expansion and reduction in the case of bleeding. Image data has meta data showing causal relationship attached (refer, for example, to INGA_METADATA in FIGS. 4 and S35 in FIG. 5) and the image processing section (image processing device) performs annotation based on the metadata (refer, for example, to FIG. 3, and S3, S3a, S7 and S7a in FIG. 6). The image processing section (image processing device) determines training data in the event that reliability of an inference model that has been created by the learning section (inference engine) is higher than a predetermined value (refer, for example, to S11 and S13 in FIG. 6).

Also, the training data adoption section if functions as a data processing section (data processing device) that, for information data that has been obtained continuously in time series from an information acquisition device (for example, the imaging device 6, image acquisition device 3, information acquisition device 3b), acts in cooperation with the control section 1a to set provisional training data by performing annotation on a plurality of items of data that have been obtained up to a second time that has been traced back from data obtained at a specified first time, and among a plurality of items of data that have been subjected to annotation, sets those data having high correlation for causal relationship with data of the first time as adopted training data (refer, for example, to FIG. 2A, FIG. 2B, FIG. 3, and S3, S3a, S7, S7a, S11 and S13 in FIG. 6). Also, at the time of input data acquisition, the inference model for guidance is capable of outputting guidance information that can display guidance at the time of displaying this data.

Also, the training data adoption section if functions as a data processing section (data processing processor) that makes data, among the provisional training data (a plurality of items of data that have been subjected to annotation) having high correlation of causal relationship to data for the first time, into adopted training data (refer to FIG. 6) The inference model for guidance receives image data as input, and is capable of outputting guidance information that can display guidance at the time of displaying the image data. As a result it becomes possible for the user to cope with things that are likely to happen from now on using the guidance, at the same time as confirming current conditions.

It should be noted that the provisional training data has a possibility of becoming a massive amount of data, depending on trace back time of a predetermined time and acquisition period (frame rate) of acquired images, and so images may be compressed and expanded as necessary, and limited to only characteristic images etc. In particular, in cases such as where the same scene continues regardless of annotation effects, since it is often the case that there is no relation to causal relationships, these images are removed from training data candidates. Also, in a case where treatment etc. has been carried out, trace back time may be determined with a point in time where an object (treatment device) has intruded into a screen set as a start point. In any event, in a case where acquired image are used, a point where acquired images change, such as the above described detection of an intruding object, may be made a start point for trace back, and information on factors of cause and effect may be requested taking into consideration data of other types of sensors.

Also, with this embodiment, data having a high possibility of being associated with a specified event (high reliability) is organized as training data, is successively accumulated, and training data at the time of creating an inference model for guidance continues to increase. In other words, data as an asset for creating a highly reliable inference model is collected. That is, a data group given a high reliability as a result of first reliability confirmation (since a process that is the same as learning is executed this may be expressed as a first learning step) is made training data, and after this first learning step it is possible to construct a database that is capable of creating inference models that are capable of higher reliability guidance, using a second learning step.

An inference model that has been generated in the learning section 1c is output to the learning results utilization section 1e. The learning results utilization section 1e transmits the inference model that has been generated to an inference engine, such as the image inference section 2AI.

Here, deep learning will be described. "deep learning" is the processes of "machine learning" that uses a neural network formed as a multilayer structure. A "feed forward neural network", which performs determination by sending information from the front to the back is typical. A feed forward neural network, in its simplest form, would have three layers, namely an input layer comprising N1 neurons, an intermediate layer comprising N2 neurons that are provided with parameters, and an output later comprising N3 neurons corresponding to a number of classes to be determined. Each neuron of the input layer and intermediate layer, and of the intermediate layer and the output later, are respectively connected with a connection weight, and it is possible for the intermediate later and the output layer to easily form a logic gate by adding bias values.

While a neural network may have three layers if it is to perform simple determination, by providing many intermediate layers it becomes possible to learn how a plurality of feature amounts are combined in processes of machine learning. In recent years, neural networks having from 9 to 152 layers have become practical, from the view point of time taken in learning, determination precision, and energy consumption. Also, a "convolution type neural network" that performs processing called "convolution" to compress feature amounts of images, operates with minimal processing, and is strong at pattern recognition, may be used. It is also possible to use a "recurrent neural network" (or a fully connected recurrent neural network) that handles more complex information, and in which information flows bidirectionally in accordance with information analysis in which implication is changed in accordance with order and sequence.

In order to implement these techniques, a conventional generic computational processing circuit, may be used, such as a CPU or FPGA (Field Programmable Gate Array). However, this is not limiting, and since most processing in a neural network is matrix multiplication it is also possible to use a processor called a GPU (graphic processing unit) or a tensor processing unit (TPU), which specialize in matrix calculations. In recent years there have also been cases where a "neural network pressing unit" (NPU) which is dedicated hardware for this type of artificial intelligence (AI) has been designed capable of being incorporated by integrating together with other circuits, such as a CPU, to constitute part of the processing circuitry.

Besides these dedicated processors, as approaches to machine learning there are also, for example, methods called support vector machines and support vector regression. The learning here is calculation of discriminator weights, filter coefficients and offsets, and as well as this is a method that uses logistic regression processing. In a case where something is determined in a machine, it is necessary for a human to teach the machine how to make the determination. With this embodiment, image determination adopts a method of calculation using machine learning, but besides machine learning it is also possible to use a rule based method that adapts rules that have been acquired by a human by means of experimental rule and heuristics.

The control section 1a is a processor having a CPU (Central Processing Unit) 1aa, memory lab, and peripheral circuits. The control section 1a controls each section within the image inference learning device 1 in accordance with programs stored in the memory lab. For example, the control section 1a assigns annotation to a training data candidate group (refer to FIG. 6).

Next, an example of image collection and an example of guidance display based on these images will be described for a case of carrying out treatment using an endoscope, using FIG. 2A and FIG. 2B. This endoscope has the imaging device 6 shown in FIG. 1, and accordingly has the image acquisition device 3, memory 4, image inference device 2, and guidance section 5.

FIG. 2A is a drawing showing an example of bleeding BL occurring inside a body at the time of treatment with the endoscope, with the bleeding spreading resulting in expanded bleeding BLL. The image acquisition device 3 of the endoscope normally collects image data at predetermined time intervals during treatment by a physician, and stores the image data in the memory 4 as image data candidate group 4b. In the example shown in FIG. 2A bleeding occurs at time T=0, the control section 7 analyzes the image data candidate group 4b, and at time T=T1a it can be confirmed that bleeding has spread. In this case, the control section 7 traces time back from this time T=0, and stores image data ID1 from a time 5 second before in the storage section 1g as an image at the time of bleeding spread.

If annotation to the effect that there is expanded bleeding BLL after time T=T1a is attached to the image data ID1 that has been collected, it becomes training data. With this embodiment annotation is performed in the image inference learning device 1 (refer to S3a in FIG. 6), but may be executed in the imaging device 6. With this embodiment, in the imaging device 6 an event name indicating bleeding spread, and metadata for causal relationships indicating the possibility of bleeding spread (INGA_METADATA, IN_Possible, GA_Possible), are attached to an image file (refer to FIG. 4 and FIG. 7).

FIG. 2B is a drawing showing an example where bleeding has occurred within a body at the time treatment with an endoscope, but the bleeding has then reduced after that. Similarly to the example of FIG. 2A, the image acquisition device 3 of the endoscope normally collects image data at predetermined time intervals during treatment by a physician, and stores the image data in the memory 4 as image data candidate group 4b. In the example shown in FIG. 2B bleeding occurs at time T=0, the control section 7 analyzes the image data candidate group 4b, and at time T=T1b it can be confirmed that bleeding has reduced. In this case also, image data ID2 from a time traced back 5 seconds before from this time T=0 is collected as an image at the time of reduced bleeding.

If annotation to the effect that there is reduced bleeding BLL after time T=T1*b* is attached to the image data ID2 that has been collected, it becomes training data. With this embodiment annotation is performed in the image inference learning device 1 (refer to S7*a* in FIG. 6), but may be executed in the imaging device 6. With this embodiment, in the imaging device 6 an event name indicating reduced bleeding, and metadata for causal relationships indicating the possibility of reduced bleeding (INGA_METADATA, IN_Possible, GA_Possible), are attached to an image file (refer to FIG. 4 and FIG. 7).

In FIG. 2A and FIG. 2B, Time T=0 is a time when the user notices bleeding, and actions and phenomena constituting causes of bleeding will often occur at a time before time T=0. Therefore, with this embodiment, if there is an event (for example, bleeding spread or reduced bleeding etc.) trigger information is generated, time is traced back beyond that specified time, data is collected, and causal relationships are organized. For example, there are cases such as where injury occurs when a treatment device etc. contacts the inside of the body, and there is bleeding. In the event that there is bleeding, there is trace back to previous image data, and if the treatment device etc. has made contact etc. it is judged that there is a possibility of a cause of bleeding, and metadata indicating the possibility of bleeding spread (IN-_Possible) is attached.

A method of performing annotation by determining bleeding spread of reduced bleeding is an extremely useful method when creating effective training data. There is also the possibility of events where treatment is carried out skillfully and there is no bleeding, and in this case what to make a trigger to detect data is difficult. Specifically, it can be assumed that there are three cases, namely a case where there is bleeding and the bleeding spreads, a case where the bleeding is reduced, and a case where there is no bleeding. Among these three cases, if data is collected for the case where nothing occurs, in order to be made into training data for a "case where nothing has occurred", it is necessary to collect a large amount of anonymous nothing has occurred images. Conversely, detection of an event such as "there is bleeding" is simple, but in this case only training data for "bleeding has occurred" is collected, and there is a disadvantage in that determination of what is good and what is bad is difficult. This means that these three cases together include a large amount of shared images, and so a noise component becomes excessive. In this embodiment, when bleeding has occurred, in cases where bleeding has spread and in cases where bleeding has reduced, these cases are divided, and different annotation is performed as an example where the former is not good and an example where the latter can be tolerated. This means that while common anonymous images are not adopted, images equivalent to a "cause" of a causal relationship for what happened as a result of bleeding having occurred are selected with good precision. Also, determination of slight differences (not differences from when absolutely nothing occurred) is beyond a person's visual observation, and it is a major objective to be able to perform determination using machine learning and artificial intelligence in order to augment human actions.

A method such as has been described above has extremely efficacious application, and can be considered to be an effective method also in problem determination besides whether or not there is bleeding during treatment. Specifically, if the above described specific example is made a generic concept, the inference learning device comprises a data processing section, the data processing section, for data that has been obtained continuously in time series from the data acquisition device, performing annotation on a plurality of items of data that have been acquired up to a second time that has been traced back from data obtained at a first specified time to make provisional training data, and making data, among the plurality of items of data that have been subjected to annotation, that have high correlation of causal relationship to data of the first time into adopted training data, wherein annotation that is performed by the data processing section is made different depending on data appearance change (spreading or reducing) for a time that is continuous to the first time (the time of bleeding). Annotation is changed depending on image appearance change (for example: spreading, reducing, subject deformation, intrusion from outside the screen) for a time that is continuous to the first time (time of bleeding). According to this method, more significant inferred guidance is possible that, although nothing is known at the first time, makes it possible to know what will happen at the continuing or following time.

According to this method, without being limited to image data, in a case where body temperature has risen, depending on whether there is instant cooling down or delayed cooling down, deteriorating symptoms after that will differ, and it also becomes possible to apply monitoring of lifestyle habits including these differences. Also, images obtained by tracing back may be created by combining a plurality of images having different shooting directions, such as, for example, panoramic combined photographs. Particularly with a digestive system endoscope, photographs are taken while moving the device, and at this time there are cases where a treatment device etc. appears in a plurality of screens that have been obtained continuously. This is because it is possible to more accurately grasp conditions by performing determination by combining these images.

Looking at this embodiment from the viewpoint described above, the inference learning device of this embodiment is provided with a data processing section that, for data that has been obtained continuously in time series from the data acquisition device, creates provisional training data by performing annotation on a plurality of items of data that have been obtained from a predetermined first time to a second time that has been traced, and among the plurality of data that have been subjected to annotation makes those having high correlation of causal relationship with data of the first time into adopted training data. Then, annotation is performed on image data obtained by the data processing section, for example, combining the plurality of images (data) acquired at up to the second time.

Examples of combining and processing a plurality of images are not only panorama shooting, and there is high resolution processing using a plurality of images, and removal of mist, smoke and fog using a plurality of items of information (arising when using an electro-surgical knife when performing operations, or cleaning etc.), and annotation may be performed on these images. In this case, if information indicating that images are images that have been subjected to combination processing is also stored together, similarly processed images are input to an inference engine that has been learned with these combined images and information as training data, and more accurate determination becomes possible. However, this treatment is not always required since there are cases where there is no mist, smoke, or fog, or there will also be cases where a necessary region is being photographed even without panorama combination.

It should be noted that with this embodiment description has been given assuming guidance is given to stop bleeding (bleeding is the effect in a cause and effect), but since there will be also cases where bleeding will be the cause in cause and effect, annotation may be performed on bleeding images using information subsequent to that. If learning is performed using training data that has been subjected to this annotation, it is also possible to make AI that, at the time of bleeding, is capable of determining if the bleeding is critical or not, and prognostic prediction etc.

With the examples of FIG. 2A and FIG. 2B, it is possible to create a lot of training data by collecting multiple items and performing annotation, and this can be treated as big data. The learning section 1c generates an inference model using this large amount of training data. In a case where bleeding occurs at time T=0, this inference model can infer if bleeding will spread or reduce after a predetermined time has elapsed (in the examples shown in FIG. 2A and FIG. 2B, T1a or T1b).

If this type of inference model is created and this inference model is set in the inference section 2AI of the imaging device 6, it is possible to predict future events based on images acquired using the image acquisition section 3, Specifically, if bleeding is confirmed at time T=0 while time T=1 has not been reached, then as shown in FIG. 2A and FIG. 2B the imaging device 6 can predict whether bleeding will spread or reduce by inputting training data (or training data candidates) based on image data up to time (T=−5 sec), that has been traced back a predetermined time from that time (TO), to the inference model. If this prediction (inference) result is that bleeding will spread, then warning display Ga is displayed on the guidance section 5 of the imaging device 6. On the other hand, if the prediction (inference) result is that bleeding will reduce, guidance Go indicating that the situation is fine despite bleeding is displayed.

Next, creation of the inference model used in FIG. 2A and FIG. 2B will be described using the flowchart shown in FIG. 3. This flow is implemented by the CPU 1aa of the control section 1a within the image inference learning device 1 in accordance with programs that have been stored in the memory lab.

If the flow for inference model creation shown in FIG. 3 is commenced, first, process images for when bleeding has spread are collected (S1). As was described previously, the imaging device 6 collects bleeding spread images in which an area of a section with blood has increased, between times T=0 and T=1, as shown in FIG. 2A, from among continuous images that have been stored as an image data candidate group 4b. Specifically, in previously described FIG. 2A, the control section 7 performs image analysis for the image data candidate group 4b, and if it has been determined that bleeding is spreading trigger information is generated (refer to S27 in FIG. 5), analysis is performed by tracing back the image data candidate group 4b that is stored, and bleeding spreading images are stored (refer to S29 in FIG. 5). The traced back stored images have a causal relationship flag attached (refer to FIG. 4), and are then stored in the memory 4 as a training data candidate group 4c. The result image input section 1b is input with the training data candidate group 4c stored in this memory 4 and stores it in the storage section 1g.

In step S1, if process images for when bleeding has spread have been collected, annotation of "bleeding spread" is performed on this image data (S3). Here, the control section 1a within the image inference learning device 1 applies the annotation of "bleeding spread" to the individual image data that has been collected, and the image data that has been subjected to annotation is stored in the storage section 1g.

Next, process images for at the time of reduced bleeding are collected (S5). As was described previously, the imaging device 6 collects reduced bleeding images in which area of a section with blood is reducing from between time T=0 and time T=1, as shown in FIG. 2B, from among continuous images that have been acquired by the image acquisition device 3. Specifically, in previously described FIG. 2B, the control section 7 performs image analysis for the image data candidate group 4b, and if it has been determined that bleeding is reducing trigger information is generated (refer to S27 in FIG. 5), analysis is performed by tracing back the image data candidate group 4b that is stored, and bleeding reducing images are stored (refer to S29 in FIG. 5). The traced back stored images have a causal relationship flag attached (refer to FIG. 4), and are then stored in the memory 4 as a training data candidate group 4c. The result image input section 1b is input with the training data candidate group 4c stored in this memory 4 and stores it in the storage section 1g.

In step S5, if process images for when bleeding has reduced have been collected, annotation of "reduced bleeding" is performed on this image data (S7). Here, the control section 1a within the image inference learning device 1 applies the annotation of "reduced bleeding" to the individual image data that has been collected, and the image data that has been subjected to annotation is stored in the storage section 1g. It should be noted that as has been described up to now, it may be assumed that this image data is handled a single continuous frame at a time, but a plurality of frames can also be handled collectively (the same also applies to at the time of bleeding spread).

With the flow shown in FIG. 3, after collecting process images at the time of spreading bleeding in step S1, process images at the time of reduced bleeding are collected in step S5. However, in actual fact it is determined whether or not bleeding is occurring within images that have been collected by the image acquisition device 3, and if it has been determined that bleeding has occurred steps S1 to S7 are appropriately selected and executed in accordance with whether bleeding is spreading or reducing in a range in which bleeding is recognized.

Next, an inference model is created (S9). Here, the learning section 1c creates an inference model using the training data that was subjected to annotation in steps S3 and S7. This inference model is made to be able to predict such that, for example, "spread of bleeding after ○ seconds" is output, when an image has been input. Here also, image data input for inference may be assumed to be single continuous frames, but it may also be made possible to perform determination by handling multiple frames collectively so as to include difference data between frames.

Once an inference model has been generated, it is determined whether or not reliability is OK (S11). Here, the learning section 1c determines reliability based on whether or not image data for reliability confirmation, for which an answer is known in advance, and output in the case where an image has been input to this inference model, have the same answer. If reliability of the inference model that has been created is low, the proportion of matching responses will be low.

If the result of determination in step S11 is that reliability is lower than a predetermined value, training data is chosen (S13). If reliability is low, there will be cases where reliability is improved by choosing training data. In this step therefor, the training data adoption section if is set to remove image data that does not have a causal relationship. For example, training data that does not have a causal relationship between cause and effect of bleeding spreading or reducing is removed. This processing prepares an inference model for inferring causal relationships, and training data for which reliability is low may be automatically eliminated. Also, population conditions for training data may be changed. Once training data has been chosen, processing returns to step S9, and an inference model is created again.

It should be noted that as has been described so far, image data constituting this training data that will be chosen may be handled one continuous frame at a time, but may also be handled as single training data by collecting together a plurality of frames and including time difference (image change) information. If this sort of information is input and an inference model generated, inference and guidance that also includes speed information to say that it will be fine if bleeding remains slow, but fast spreading will be troublesome, also becomes possible. Also, determination may be made together with other information.

On the other hand, if the result of determination in step S11 is that reliability is OK, the inference model is transmitted (S15). Here, since the inference model that has been generated satisfies a reliability reference, the training data adoption section 1f determines the training data candidates used at this time to be training data. Also, the learning results utilization section 1e sends the inference model that has been generated to the imaging device 6. If the imaging device 6 has sent the inference model, the inference model is set in the inference section 2AI. Once the image inference learning device 1 has sent the inference model to the imaging device 6, the flow for inference model creation is terminated. It should be noted that if this inference model that has been sent is sent together with information such as specifications of that inference model, control is possible that reflects, at the time of inference in the imaging device, whether inference is performed with a single image, is determination with a plurality of images, how long a time difference there is between those images (frame rate etc.). Other information may also be handled.

In this way, in this flow, the learning device is input with image data from the image acquisition device 3 (S1, S5), training data is created by performing annotation on this image data (S3, S7), and an inference model is obtained by learning using this training data that has been created (S9). In particular, for images that have been obtained continuously in time series from the image acquisition device 3, annotation is performed on image data of the time that has been traced back from the specified time ((S3, S7, S13) as training data (S11 S13). In this way, within image data that is normally output, time is traced back from a specified time when some event occurred (for example, bleeding spread or bleeding was reduced), time series image data is acquired, and annotation is performed on this image data to give training data candidates. An inference model is generated by performing learning using these training data candidates, and if reliability of the inference model that has been generated is high the training data candidates are made training data.

Specifically, in this flow, an inference model is generated using data that has been traced back from a specified time when some event occurred. That is, it is possible to generate an inference model that can predict future events based on events that constitute causes corresponding to an effect at a specified time, that is, based on causal relationships. Even in the case of small actions and phenomena that the user is unaware of, if this inference model is used it is possible to detect future events without overlooking those actions and phenomena, for example, it is possible to issue cautions and warnings in cases where, for example, accidents have arisen. Also, even when there are worries the user is aware of, if nothing comes of this it is possible to notify to that effect.

The image inference learning device 1 of this flow can collect the training data candidate group 4c from many imaging devices 6, which means that it is possible to create training data using an extremely large amount of data, and it is possible to generate an inference model of high reliability. Alternatively, with this embodiment, in the case where an event has occurred, since the learning device collects data by narrowing in on data in a range related to this event, it is possible to generate an efficient inference model.

It should be noted that in this flow the image inference learning device 1 collects the training data candidate group 4c etc., from the imaging device 6, and annotation such as bleeding spread etc. is performed on the image data (refer to S3 and S7). However, the imaging device 6 may generate the training data candidate group 4c by performing these annotations, and this training data candidate group 4c may be sent to the image inference learning device 1. In this case, it is possible to omit the process of performing annotation in the image inference learning device 1. That is, in this flow, the control section 1a within the image inference learning device 1 and the control section 7 within the imaging device 6 may be implemented cooperatively. In this case the CPU within each control section controls each device and each section in accordance with programs stored in memory within the control section.

Next, the structure of the image file will be described using FIG. 4. As was described using FIG. 2A and FIG. 2B, the imaging device 6 stores image data a predetermined time apart in the memory 4. Then, the image inference learning device 1 performs annotation of bleeding spread etc. on the image data that was collected from a time before the predetermined time when an event occurred. In order to perform this annotation, various information relating to the image is stored in the image file, and in particular, metadata relating to causal relationship is attached, to be used when determining causes and effects of bleeding. Information besides image data is acquired mainly from the information acquisition device 3b.

In FIG. 4, the image file IF1 shows structure of an image file for time T=−5 sec. It should be noted that, similarly to FIG. 2A, time T=0 is the time when bleeding has occurred, and the time T=−5 sec is a time traced back 5 seconds from time T=0. The image file IF1 has an image data etc. ID1, an acquisition time TT1 and an event name EM1, and as metadata MD1 IN_METADATA, IN_Possible, and GA_Possible are stored.

The image data etc. ID1 is image data that was acquired by the image acquisition device 3. The file is not limited to image data and may also include audio data and other data. The acquisition time TT1 shows the time that the image data etc. ID1 was acquired, and the acquisition time is stored with reference to a specified time. The event name EN1 stores patient illness, for example, the possibility of them being a novel corona-virus patient, name of affected part that has been photographed, type of treatment device used in treatment, etc. Also, if conditions such as bleeding etc., associated medical institutions, names of physician etc. are stored, then in a case where bleeding has spread, as in FIG. 2A, it is possible to prevent confusion with other data.

The metadata MD1 is metadata showing causal relationships, with IN_Possible representing a case where there is a possibility of a phenomenon that is a cause, and GA_Possible representing a case where there is a possibility of a phenomenon being an effect. Specifically, IN_METADATA represents that there is a possibility of constituting a cause of an effect (here, bleeding spreading or reducing), and GA_METADATA represents that there is a possibility of an effect (here, bleeding spread or reduced) having arisen based on a particular cause. In a step where the image file is generated, causal relationships are not defined, and in particular, events constituting causes are unclear. metadata MD1 therefore only indicates that there is a possibility.

The image file IF2 shows structure of an image file for time T=0. The image file IF2 also, similarly to the image file IF1, has image data etc. ID2, acquisition time TT2, event name EN2, and metadata MD2.

In FIG. 4, the arrow shows metadata for IN_Possible constituting a cause is stored, and metadata for GA_Possible constituting an effect is stored. A time interval between these two image files is preferably a reasonable time interval (RITS: Reasonable Inga (cause and effect) Time Span). For example, it is sufficient for a time interval that occurs at the time of endoscope examination to be a number of minutes. On the other hand, in cases where there has been infection with influenza or novel corona virus, a time interval of a number of days is required.

However, since IN_Possible and GA_Possible are set both of the image files IF1 and IF2, the two image files show that there is a possibility of cause and effect. Also, causal relationships are defined in the flow shown in FIG. 8. It should be noted that metadata MD1 and MD2 showing causal relationships are attached in the flow shown in FIG. 7, which will be described later.

In this way, cause and effect metadata INGA_META-DATA is stored in the image file shown in FIG. 4. Meta data showing that there is data having a possibility of being associated with causes or effect is attached to data of the image file, or, metadata that might become a cause is attached to data representing some cause, or metadata is attached to data that might be an effect based on some cause. These items of data are attached to the training data group 4*c*, and sent to the image inference learning device 1 (refer to S35 in FIG. 5).

Next, operation of the imaging device 6 will be described using the flowchart shown in FIG. 5. This operation is executed by the control section 7 within the imaging device 6 controlling each device and each section within the imaging device 6. It should be noted that this imaging device 6 will be described as an example that is provided within an endoscope device. Also, with this flow operations that are generally performed, such as power supply ON and OFF, will be omitted.

Figure 5:
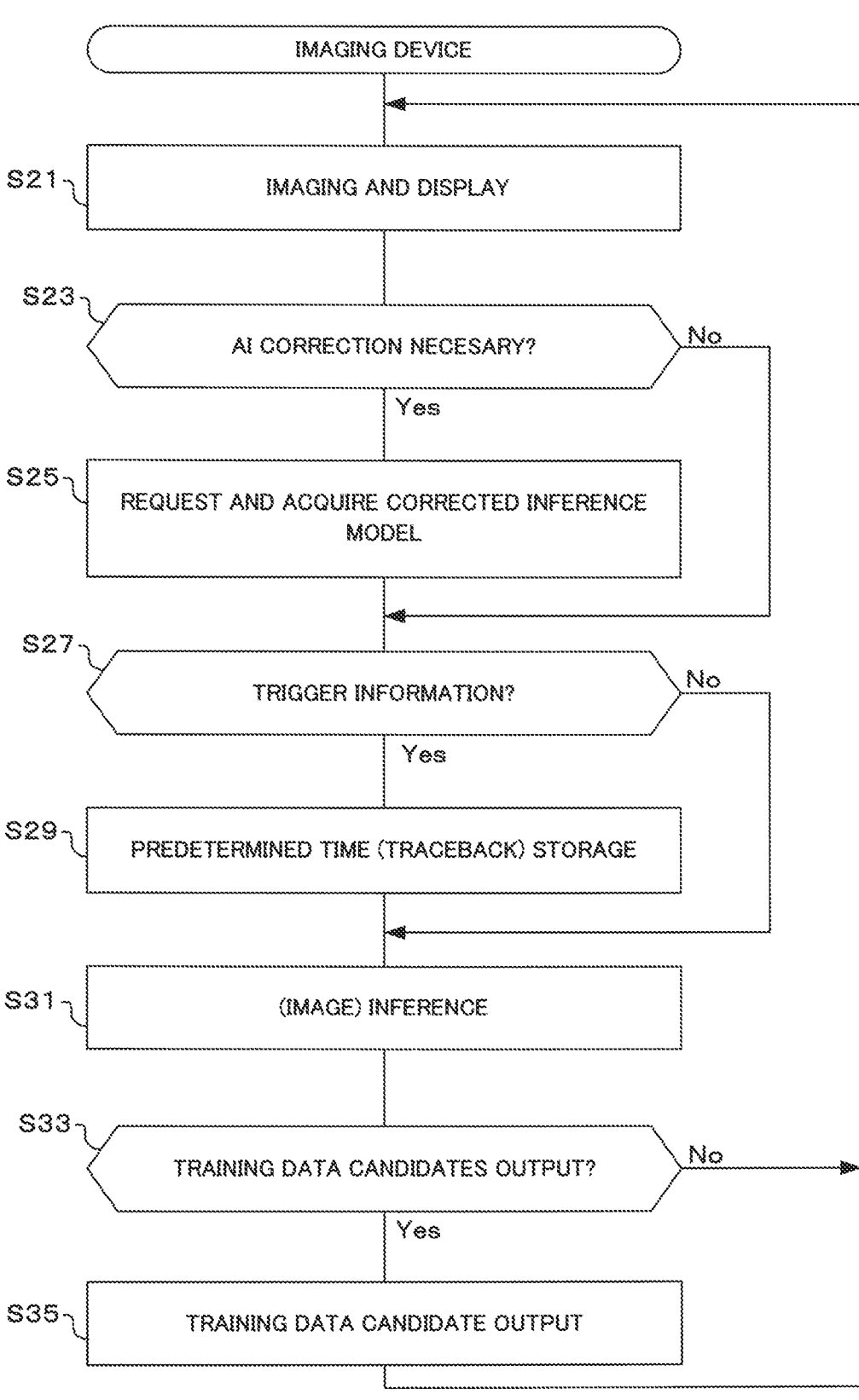
FIG. 5 is a flowchart showing, in an imaging device that cooperates with the inference learning device of one embodiment of the present invention, operation of this imaging device.

If the flow shown in FIG. 5 is commenced, first, imaging and display are performed (S21). Here, if the image acquisition device 3 acquires image data and predetermined time intervals (determined by frame rate), the guidance section 5 performs display based on this image data. For example, if the imaging device 6 is provided within the endoscope device, images within the body that have been acquired by an image sensor provided on a tip of the endoscope are displayed in the guidance section 5. This display is updated every predetermined time that is decided by frame rate.

Next, it is determined whether or not AI correction is necessary (S23). With regard to an inference model, there are cases where a device that is used (for example, the imaging device 6 being provided) is changed, the version is upgraded, or the device becomes inappropriate for other reasons etc. In this type of situation, it is preferable to correct an inference model that is set in the inference section 2AI.

In this step therefore, the control section 7 determines whether or not it is necessary to correct the inference model.

Also, as was described previously, with this embodiment the inference section 2AI is input with image data that has been acquired by the image acquisition device 3, and guidance display is issued to the user. The inference section 2AI performs inference using the inference model. There may be cases where the inference model cannot perform guidance display in a case where there is bleeding during treatment. In a case where this type of condition has occurred, it becomes necessary to correct the inference model so that guidance display such as shown in FIG. 2A and FIG. 2B can be performed.

If the result of determination in step S23 is that it is necessary for AI to correct, then generation of a corrected inference model is requested, and acquired (S25). Here, the imaging device 6 requests generation of a corrected inference model to the image inference learning device 1, and once the inference model has been generated it is acquired. At the time of requesting the corrected inference model, information such as where correction is necessary is also sent.

Once the corrected inference model has been acquired, or if the result of determination in step S23 is that AI correction is not required, it is next determined whether or not there is trigger information (S27. For example, as was described using FIG. 2A and FIG. 2B, in a case where an event has occurred, for example, the occurrence of bleeding at a midpoint of treatment, in a case where this bleeding is spreading trigger information is generated. In this example, the control section 7 analyzes image data that has been acquired by the image acquisition device 3, and output of trigger information may be performed in a case where it is determined that bleeding is spreading. Also, this image analysis may be performed by AI using the inference model, and trigger information may be output as a result of a physician operating a specified button or the like manually.

If the result of determination in step S27 is that trigger information has occurred, traceback storage for a predetermined time is performed (S29). Here, image data that has been acquired by the image acquisition device 3 is traced back for a predetermined time, and stored in the image data candidate group 4*b* within the memory 4. Normally, all image data that has been acquired by the image acquisition device 3 is stored as an image data candidate group 4*b* in the memory 4, and image data for a time period from a specified time when it is determined that trigger information has been generated to a time that has been traced back a predetermined time, is moved to the training data candidate group 4*c*. If there is no trigger information, the control section 7 may appropriately erase the image data candidate group 4*b*. With the example shown in FIG. 2A and FIG. 2B, the specified time is the time point where bleeding has spread, and the traced back time is the time of T=−5 sec from the specified time (for example, in FIG. 6, which will be described later, T=−1 sec). It should be noted that if image data for T=0 to T=T1*a* is added to the image data candidate group 4*b*, learning including progress of spreading of bleeding is possible.

Also, since bleeding spread is a time that can be easily recognized as being different to reduced bleeding, it is a time when what type of conditions there are is known. In FIG. 2A and FIG. 2B, the time when bleeding has spread and the time when bleeding has reduced are made the specified time, but the time when bleeding actually starts may also be made the specified time. As an "effect" of a causal relationship, the fact that bleeding occurred in relation to treatment is a problem, and so there is trace back to the time when this bleeding happened, and that time may be made a specified time.

Once this traced back storage has been performed in step S29, or if the result of determination in step S27 is that there was no trigger information, then next, image inference is performed (S31). Here, image data that has been acquired by the image acquisition device 3 is input to the image input section 2IN of the image inference device 2, and the inference section 2AI performs inference. If the inference results output section 2OUT has output inference results, the guidance section 5 performs guidance based on the output results. For example, as shown in FIG. 2A and FIG. 2B, at time T=−5 sec, inference is carried out, and display to the effect that bleeding looks likely to start 5 second later is performed based on these inference results. Also, at time T=0, if there is bleeding, display Ga or display Go is performed based on inference results of whether bleeding is spreading or bleeding has reduced. It should be noted that besides the image inference device 2, in a case where there are a plurality of image inference devices, such as image inference devices 2a, it is possible to perform a plurality of inferences. For example, it becomes possible to perform other predictions besides for prediction of bleeding.

If image inference has been performed, it is next determined whether or not to output training data candidates (S33). Here, it is determined whether or not the control section 7 has performed the trace back and storage in step (S29). If the result of this determination is that traceback and storage have not been performed, processing returns to step S21.

If the result of determination in step S33 is Yes, the training data candidates are output (S35). Here, the control section 7 outputs the training data candidate group 4c of the memory 4 to the image inference learning device 1. Also, candidate information 4a such as bleeding spread is associated with the training data candidate group 4c and output to the image inference learning device 1. As was described previously, it is possible for the image inference learning device 1 to make the training data candidates by performing annotation of this candidate information on the image data.

It should be noted that before outputting the training data candidate group 4c to the image inference learning device 1, metadata MD1 such as shown in FIG. 4 is attached to each image file, and the image files to which this metadata has been attached are then output to the image inference learning device 1 as the training data candidate group. Once the training data candidates have been output, processing returns to step S21.

In this flow, causal relationships have been described in a simplified manner, such as progress of treatment and bleeding, but it is possible to improve precision by actually applying further schemes. Also, for example, in order to more accurately predict ease of bleeding, location of bleeding, and difficulty in stopping bleeding, it is possible to further reflect other factors such as body type, like blood viscosity condition, and eating habits, drinking supplements etc., and to take into consideration data that has been obtained by tracing back. That is, it is also possible to reflect to the extent of ethnic differences, such as genetic elements, lifestyle habits etc. Also, besides these factors it is possible to reflect site information at the time of performing treatment. Data is organized separately for hospitals and physicians, and for treatment devices used in those hospitals and by those physicians, and learning of similar patterns may be learned and inferred based on organized data. If this type of processing is performed, reliability of guidance etc. is improved. For example, it is also possible to use this type of processing in a case where it is desired to estimate if a malignant tumor will return. Also, it is better to differentiate between cases where the same condition is repeated, or the same location is repeated etc., and cases where they are not repeated. That is, it may be made possible to determine particulars etc. of previous operations. In some cases it is not possible to put all "causes" of a causal relationship in a single cause, and it is possible to have a traceable system that enables cause and effect to be strung together, by making previous information and conditions, such as patient name, location, lifestyle habits, heredity, etc., and conditions, traceable.

Trigger information in step S27 of the flow shown in FIG. 5 was described for an example where there was bleeding inside a body when an endoscope was used. However, it is also possible to apply this embodiment to situations other than bleeding. For example, in a case where it is possible to measure body temperature and body weight using a wearable sensor, trigger information is generated if body temperature rises, and body temperature data, body weight data, and other data (including image data) up to then may be traced back and stored. If these items of data are made training data, and sent to the inference learning device, it becomes possible to generate an inference model.

Also, in step S35 in the flow shown in FIG. 5, a training data candidates group that has been created based on trace back and storage is sent to the image inference learning device 1. At this time, the training data candidates group used by the image inference learning device 1 in inference need be not only trace back of image data that was stored in the same device (imaging device 6), but may also be looking up of causal relationships by tracing back retrieved data of other devices.

Next, operation of corrected inference model creation will be described using the flowchart shown in FIG. 6. This flow is implemented by the control section 1a of the image inference learning device 1 controlling each section within the image inference learning device 1. Similarly to the flow shown in FIG. 3, this flow is an example of the image inference learning device 1 creating an inference model based on images for a case where bleeding has spread and a case where bleed has reduced.

If the flow for inference model creation shown in FIG. 6 is commenced, first, process images for when bleeding has spread are collected (S1a). As was described using FIG. 2A, there are cases where bleeding has spread at the time of treatment, and the result image input section 1b collects images at this time from the imaging device 6. With the example shown in FIG. 2A, images for the period from T=−5 second to T=−1 second are collected.

If images have been collected in step S1a, then next, annotation of "bleeding spread" and time is performed (S3a). Here, in order to use as training data candidates, the control section 1a performs annotation to the effect that "bleeding has spread", and the time at which that image was acquired, on the image data.

In this flow, "bleeding" is described in the example. However, as well as bleeding, as problems that arise as a result of treatment procedures and the passage of time, there are important locations besides blood vessels, various glands, and nerves being cut and punctured, the wrong location being treated, tumors being left due to mistaken cutting range, hemoclips being placed at wrong positions, forgetting to remove gauze, etc. There are also problems too numerous to mention such as problems of anesthesia arising due to treatment time being too long, decline in patient physical fitness, and damage to other areas at the time of abdominal section etc. From the viewpoint of detecting these problems and recovering from such problems, appropriate training data is created by adapting annotation, such as "damage recovery", or "damage recovery not possible", performing learning using this training data, and creating an inference model. It then becomes possible to provide user guidance that uses this inference model. The above described problems are "effects" of "cause and effect", that may arise if proper checking is not performed, and the "effects" may then become "causes" if problems arise with patients, including during and after an operation. If a problem occurs with a patient, it becomes possible to provide guidance to predict and infer problems that may arise later with a patient by performing annotation of "cause" images acquired during an operation, and performing annotation of a problem occurring as an "effect".

Next, process images for at the time of reduced bleeding are collected (S5a). As was described using FIG. 2B, there are cases where bleeding has reduced at the time of treatment, and the result image input section 1b collects images at this time. With the example shown in FIG. 2B, images for the period from T=−5 seconds to T=−1 second are collected.

If images have been collected in step S5a, then next, annotation of "reduced bleeding" and time is performed (S7a). Here, in order to use as training data candidates, the control section 1a performs annotation to the effect that "bleeding has reduced", and the time at which that image was acquired, on the image data.

If annotation has been attached to the image data in steps S3a and S7a, and training data candidates have been created, then an inference model is created, similarly to FIG. 3 (S9). Here, the learning section 1c creates an inference model using the training data candidates that were subjected to annotation in steps S3a and S7a. This inference model is made to be able to predict such that, for example, "spread of bleeding after X seconds" is output, when an image has been input.

Once an inference model has been created, it is determined whether or not reliability is OK (S11). Here, similarly to FIG. 3, the learning section 1c determines reliability based on whether or not image data for reliability confirmation, for which an answer is known in advance, and output in the case where an image has been input to this inference model, have the same answer. If reliability of the inference model that has been created is low, the proportion of matching responses will be low.

If the result of determination in step S11 is that reliability is lower than a predetermined value, then similarly to FIG. 3, training data is chosen (S13). If reliability is low, there will be cases where reliability is improved by choosing training data. In this step therefor, image data that does not have a causal relationship is removed. Once training data has been chosen, processing returns to step S9, and an inference model is created again.

On the other hand, if the result of determination in step S11 is that reliability is OK, then similarly to FIG. 3, the inference model is transmitted (S15). Here, since the inference model that has been generated satisfies a reliability reference, the training data adoption section if determines the training data candidates used at the time of inference to be training data. Also, the learning results utilization section 1e sends the inference model that has been generated to the imaging device 6. If the imaging device 6 has sent the inference model, the inference model is set in the inference section 2AI. Once the inference model has been sent, the flow for inference model creation is completed.

Next, attaching of cause and effect metadata will be described using the flowchart shown in FIG. 7. The flow for attachment of this cause and effect metadata can be applied to a general purpose device regardless of the learning system for image inference of one embodiment of the present invention. However, description will be given of a case of applying to the imaging device 6 of this embodiment. In step S35, when creating the training data candidates, cause and effect metadata IN_Possible and GA_Possible are attached within the metadata MD shown in FIG. 4. This flow shown in FIG. 7 is operation to attach this cause and effect metadata, and is executed by the control section 7 of the imaging device 6 controlling each device and each section within the imaging device 6.

If the flow for cause and effect metadata attachment shown in FIG. 7 is commenced, first, information is always provisionally stored (S41). If there is trigger information, image data is traced back and stored, but in order to do this the control section 7 normally provisionally stores information (which need not be limited to image data) in the memory 4 as an image data candidate group 4b.

Next, it is determined whether or not the information is an effect (result), of cause and effect (S43). For example, the spreading of bleeding in FIG. 2A is an effect of a causal relationship, and the reduction in bleeding in FIG. 2B is an effect if viewed in the context of a causal relationship. Specifically, the spreading or reduction of bleeding are effects that occur when there is a cause that results in bleeding. In this step, the control section 7 analyzes if there has been change in an image, such as increase in area of bleeding, and performs determination based on the result of this analysis.

If the result of determination in step S43 is that information is an effect of cause and effect, an effect flag for cause and effect is attached to the information (S45). Here, the control section 7 sets GA_Possible in the image file as cause and effect metadata.

Next, information is retrieved by tracing back provisional storage (S47). Since it has been determined in steps S43 and S45 that there is an image (information) corresponding to effect, the control section 7 retrieves information constituting a cause that brings about this effect from within provision storage in the memory 4. It should be noted that when searching provisional storage, the traceback time is changed in accordance with an effect of a causal relationship. For example, in a case of bleeding at the time of endoscope treatment it is sufficient for time to be a few minutes, but if there are symptoms associated with infections disease such as influenza or novel corona virus, or symptoms associated with gastroenteritis etc., traceback time is required to be a few days. With the flow shown in FIG. 6, traceback is performed from the time of bleeding to 5 second before. Detailed operation of provisional storage traceback information retrieval will be described later using FIG. 9.

If provisional storage traceback information retrieval has been performed, it is next determined whether or not traceback information retrieval is complete (S49). It is determined whether or not the information retrieval spanning across the traceback period that was set in step S47 is complete.

If the result of determination in step S49 is that traceback information retrieval is not complete, it is determined whether or not there is there is information having a possibility of constituting a cause (S51). In step S47 traceback information retrieval is performed and at the time of this retrieval it is determined whether or not there is information that possibly constitutes a cause corresponding to an effect that was determined in steps S43 and S45. If the result of this determination is that there is not information having a possibility of constituting a cause, processing returns to step S47, and information retrieval continues.

On the other hand, if the result of determination in step S51 is that there is information that has a possibility of constituting a cause, a cause flag of a causal relationship is attached to the information (S53). Here, the control section 7 sets IN_Possible in the image file as cause and effect metadata (refer to FIG. 4). If this metadata has been attached, processing returns to step S47.

If the result of determination in step S49 is completion, or if the result of determination in step S43 is that there is not an effect of cause and effect, processing returns to step S41, and the processing of step S41 is performed.

Next, determining of cause and effect metadata will be described using the flowchart shown in FIG. 8. This flow for determination of cause and effect metadata can be applied to a general purpose device regardless of the learning system for image inference of one embodiment of the present invention. However, description will be given of a case of applying to the image inference learning device 1 of this embodiment. In steps S45 and S53 of FIG. 7, cause and effect metadata is attached, and this cause and effect metadata is sent from the imaging device 6 to the image inference learning device 1 in step S35 of FIG. 5. The flow of FIG. 8 performs processing for confirming the cause and effect metadata that was attached in the flow of FIG. 7. This flow shown in FIG. 8 is executed by the control section 1a of the image inference learning device 1 controlling each section within the image inference learning device 1

If the flow for cause and effect metadata determination shown in FIG. 8 is commenced, cause information and effect information is prepared as training data (S61). Here, from among data that has been sent from the imaging device 6 as the training data candidate group 4c (refer to S35 in FIG. 5), the control section 1a extracts image files to which cause and effect metadata IN_Possible and OUT Possible has been attached.

Once training data has been prepared, next, learning is performed (S63). Here, the learning section 1c performs deep learning using the training data candidates that were prepared in step S61, and generates an inference model. The training data candidates for creating this inference model are the result of tracing back time from a specified time when an effect occurred to a time when a cause of the effect occurred, as described previously, and applying annotation to the image data for this time (refer to FIG. 6). Since the inference model is generated using these training data candidates, it becomes possible for this inference model to infer what effect will occur at a time when a cause has occurred.

Once learning has been performed, it is next determined whether or not reliability is OK (S65). Here, the learning section 1c determines reliability based on whether or not image data for reliability confirmation, for which an answer is known in advance, and output in the case where an image has been input to this inference model, have the same answer. If reliability of the inference model that has been created is low, the proportion of matching responses will be low.

If the result of determination in step S65 is that reliability is lower than a predetermined value, then training data candidates are chosen (S67). If reliability is low, there will be cases where reliability is improved by choosing training data candidates. In this step therefore, image data that does not have a causal relationship is removed. Once training data candidates have been chosen, processing returns to step S63, learning is performed, and an inference model is created again.

On the other hand, if the result of determination in step S65 is that reliability has become OK, causal relationships of the adopted training data are determined (S69). In steps S45 and S53 of FIG. 7, cause and effect metadata was simply attached, but reliability of an inference model that has been generated using training data candidates created based on this cause and effect metadata will be higher. Therefore, the training data adoption section if makes the training data candidates at this time into training data, and determines causal relationships in the training data. Once causal relationships have been determined processing returns to step S61.

Next, operation of provisional storage traceback information retrieval in step S47 (refer to FIG. 7) will be described using the flowchart shown in FIG. 9. This flow is implemented by the control section 7 of the imaging device 6 controlling each device and each section within the imaging device 6. This flow corresponds to, when it has been determined that bleeding has spread or reduced at times T=T1a and T=T1b in FIG. 2A and FIG. 2B, tracing back time, tracing back image data that has been normally stored up to then, and provisionally storing image data over the course of a predetermined time.

If the flow for provisional storage traceback information retrieval of FIG. 9 is commenced, first, the content of effect (result) information is analyzed (S71). Here, image files to which cause and effect metadata GA_Possible was attached in step S45 are analyzed. For example, in FIG. 2A, in a case where GA_Possible is attached as cause and effect metadata, range of bleeding spreads over time. If conditions that are different to normal come about GA_Possible is attached as cause and effect metadata, and so the control section 1a may analyze what the conditions that are different to normal are.

Next, search of a DB (database) etc., is performed (S73). Here, based on information analysis results for step S71, search is performed of image data etc. that is stored within the storage section 1g within the image inference learning device 1, and a searchable database that is connected to a network or the like. As the database, targets may also be data that is stored in the memory 4 within the imaging device 6. For example, as effect information, in a case where a patient has caught a cold, since there is a possibility of being related to sleep time, information relating to sleep time from some days before is retrieved. Also, as effect information, in the case of abdominal pain, meals that were eaten before are retrieved. Also, as effect information, in a case where high blood pressure has occurred, eating history such as the user's salt intake, and purchase history for food and drink on the user's smartphone, are retrieved. Also, as effect information, in a case where diabetes has occurred, eating history such as the user's sugar intake, and purchase history for food and drink on the user's smartphone, are retrieved.

Once DB search has been performed, it is next determined whether or not it is an event that occurs in daily life (S75). Here, based on the processing in steps S71 and step S73, the control section 1a determines if what has constituted a cause of a causal relationship is something that originates in daily life, or whether it is something that originates in a device or the like in a hospital or the like.

If the result of determination in step S75 is that they are regular events, cause information is determined from living information etc. (S77). Here, a cause that resulted in the occurrence of this effect is determined from among living information etc. based on effect information that was analyzed in step S71. As living information there is the user's living information generally, for example, various information such as position information of a smartphone the user is using, goods purchase history, etc.

If the result of determination in step S75 is that they are not regular events, cause information is determined from device relationships (S79). Here, a cause that resulted in the occurrence of this effect is determined from among device relationship information etc. based on effect information that was analyzed in step S71. For example, in a case where bleeding has spread at the time of treatment using an endoscope, as shown in FIG. 2A, cause information can be determined based on image data etc. at the time of treatment.

If cause information has been determined in step S77 or S79, the originating flow is returned to.

As has been described above, with the one embodiment of the present invention, image data is input from an image acquisition device (refer, for example, to S1a and S5a in FIG. 6), and for image data that has been acquired continuously in time series from the image acquisition device provisional training data is created by performing annotation on image data that has been obtained at a second time that has been traced back from a specified first time (refer, for example, to S3a and S7a in FIG. 6). Then, image data, among the plurality of image data that have been subjected to annotation, having a high correlation of causal relationship with images of the first time are made adopted training data, and an inference model is obtained by learning using the adopted training data that has been obtained by subjecting image data to annotation (refer to S9, S11 and S13 in FIG. 6, for example). In this way, there is organization from time series data into data for which causal relationships of phenomena are known, and since an inference model is created using this data that has been organized, if inference is performed using this inference model it is possible to predict future events that change. Also, it is possible to make data representing causes of a specified effect into efficient training data Further, since training data is generated taking into consideration causal relationships within time series data, it is possible to generates an inference model of high reliability.

Also, with one embodiment of the present invention, the image learning device for inference comprises an input section for inputting image data from the image acquisition device (refer, for example, to the result image input section 1b in FIG. 1, and S1a and S5a in FIG. 6), an image processing section (Image processing processor), that, for image data that has been obtained continuously in time series from the image acquisition device, subjects a plurality of image data that have been obtained at a second time that has been traced back from image data that was obtained at a specified first time (refer to S27 in FIG. 5, for example) to annotation to create provisional training data (refer, for example, to the training data adoption section if and control section 1a in FIG. 1 and to S11 and S13 in FIG. 6), and a learning section (learning device) that obtains an inference model for guidance by learning using training data that was obtained by performing annotation on image data (refer, for example, to the learning section 1c in FIG. 1, and to S9 in FIG. 6). In this way, since training data is generated taking into consideration causal relationships within time series data, it is possible to generate an inference model of high reliability.

Also, with one embodiment of the present invention, the image data acquisition device comprises an image acquisition section that acquires image data in time series (refer to the image acquisition device 3 in FIG. 1, for example), a metadata attachment section that, when an event has occurred at a specified first time during acquisition of time series image data (refer to S27 in FIG. 5, for example), traces back to a second time when a cause of the event arose, and attaches metadata showing causal relationships to the image data (refer to the control section 7 and memory 4 in FIG. 1 and to S35 in FIG. 5), and an output section that outputs image data to which metadata has been attached to the inference learning device. In this way, with the image data acquisition device, since metadata is attached to image data, it is possible to easily perform annotation on image data, and generation of an inference model becomes easy.

It should be noted that with the one embodiment of the present invention, in the imaging device 6 metadata was attached to image data (refer to S35 in FIG. 5), and the image inference learning device 1 acquired training data candidates to which this metadata has been attached (refer to S1a and S5a in FIG. 6), created training data by performing annotation on these training data candidates (refer to S3a and S7a in FIG. 6), and generated an inference model using this training data. However, this is not limiting, and image data from the imaging device 6 and information associated with image data may normally be sent to the image inference learning device 1, and then in the image inference learning device metadata may be attached, training data candidates created by performing annotation, and an inference model generated. Also, in the information acquisition device etc., data other than images, for example, time series vital data such as body temperature and blood pressure, may be acquired, and metadata attached to this data other than images. Further, training data may be created by performing annotation on data to which this metadata has been attached.

Also, in the imaging device 6, in a case where trigger information has occurred accompanying an event, annotation may be performed on image data that has been acquired by tracing back, training data created, and this training data sent to the image inference learning device 1. In this case, it is possible for the image inference learning device 1 to generate an inference model using training data candidates that have been acquired.

Also, in the one embodiment of the present invention, there was learning using the training data that was created from image data, and an inference model was generated. However, the training data is not limited to image data, and can also be created based on other data, for example, time series vital data such as body temperature and blood pressure. Specifically, as data other than image data there may be data associated with diagnosis and treatment of an illness, and further, there may also be data that is not related to diagnosis and treatment. With this embodiment, time series data is stored, and when an event such as can be said to have caused an effect has occurred, it is desired to investigate causes of that event by tracing back time series data. These items of data may be acquired in the information acquisition device 3b, and may also be acquired from other devices.

Also, with the one embodiment of the present invention, main description has been about logic-based determination, but this is not limiting, and it is also possible to perform determination by inference that uses machine learning. Either logic-based or inference determination may be used in this embodiment. Also, in the process of determination, some of the determination may be logic-based and/or performed using inference, depending on the respective merits.

Also, in the one embodiment of the present invention the control section 7 and the control section 1a have been described as devices constructed from a CPU and memory etc. However, besides being constructed in the form of software using a CPU and programs, part or all of each of these sections may be constructed with hardware circuits, or may have a hardware structure such as gate circuitry generated based on a programming language described using Verilog, or may use a hardware structure that uses software, such as a DSP (digital signal processor). Suitable combinations of these approaches may also be used.

Also, the control sections are not limited to CPUs, and may be elements that achieve the functions as a controller, and processing of each of the above described sections may also be performed by one or more processors configured as hardware. For example, each section may be a processor constructed as respective electronic circuits, and may be respective circuit sections of a processor constructed with integrated circuits such as an FPGA (Field Programmable Gate Array). Also, one or more processors are configured with a CPU, but it is also possible to execute functions of each section by executing reading of computer programs that have been stored in a storage medium.

Also, with the one embodiment of the present invention, the image inference learning device 1 has been described as comprising the control section 1*a*, result image input section 1*b*, learning section 1*c*, image retrieval section 1*d*, learning results utilization section 1*e*, training data adoption section 1*f*, and storage section 1*g*. However, these sections do not need to be provided inside an integrated device, and, for example, each of the above described sections may also be dispersed by being connected using a network such as the Internet. Similarly, the imaging device 6 has been described as having the image inference section 2, image acquisition device 3, memory 4, and guidance section 5. However, these sections do not need to be provided inside an integrated device, and, for example, each of the above described sections may also be dispersed by being connected using a network such as the Internet.

Also, in recent years, it has become common to use artificial intelligence such as being able to determine various evaluation criteria in one go, and it goes without saying that there may be improvements such as unifying each branch etc. of the flowcharts shown in this specification, and this is within the scope of the present invention. Regarding this type of control, as long as it is possible for the user to input whether or not something is good or bad, it is possible to customize the embodiment shown in this application in a way that is suitable to the user by learning the user's preferences.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, with the one embodiment of the present invention, operation of this embodiment was described using flowcharts, but procedures and order may be changed, some steps may be omitted, steps may be added, and further the specific processing content within each step may be altered. It is also possible to suitably combine structural elements from different embodiments.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An inference learning device, comprising:
an input device for inputting image data from an image acquisition device;
a learning device for obtaining an inference model by learning using training data that has been obtained by performing annotation of the image data; and
an image processing device that, for image data that has been obtained continuously in time series from the image acquisition device, makes provisional training data by performing the annotation on a plurality of items of data that have been obtained from data that was obtained at a given first time to a second time that has been traced back to a predetermined time, and makes data, among the provisional training data that has a high correlation of causal relationship with the data of the first time, into adopted training data, which is training data used in the learning device;
wherein image data input to the input device has one of:
metadata, showing that the image data is data having a possibility of being associated with a cause or an effect, attached,
metadata, showing that there is likely to be a cause, is attached to data showing that there is some cause, among image data input by the input device, or
metadata, showing that there is likely to be a second effect resulting from the first effect, is attached to data showing the first effect based on some cause, among image data input by the input device.

2. The inference learning device of claim 1, wherein the inference model is input with the image data, and it is made possible to output guidance information with which it is possible to guide actions of a user at the time of displaying the image data.

3. The inference learning device of claim 1, wherein the image processing device determines the predetermined time in accordance with events that can be determined from images at the first time.

4. The inference learning device of claim 1, wherein metadata showing information related to image data that was obtained at the first time is added to the adopted training data.

5. The inference learning device of claim 4, wherein the image processing device, for the adopted training data, attaches metadata collectively to a plurality of items of image data that are obtained over the course of a specified time difference, attaches metadata to collected image data, and uses change information for the time difference as information at the time of inference.

6. The inference learning device of claim 1, wherein the image processing device makes the annotation different based on image appearance change for a time that is continuous to the first time.

7. The inference learning device of claim 1, wherein the image processing device performs annotation on image data that has been obtained by combining a plurality of image data obtained up to the second time.

8. The inference learning device of claim 1, wherein:
image data input by the input device are cause data and effect data; and
the image processing device sets the cause data and the effect data as training data candidates, creates the inference model using these training data candidates, and if reliability of the inference model that has been created is high determines the relationships between the cause data and the effect data to be causal relationships.

9. The inference learning device of claim 1, wherein the image processing device performs annotation on data according to reaction rate of a body based on the image data, and creates training data.

10. The inference learning device of claim 1, wherein:
the image data has metadata attached thereto that shows causal relationships; and
the image processing device performs the annotation based on the metadata.

11. The inference learning device of claim 1, wherein the image processing device determines the provisional training data to be the adopted training data if reliability of the inference model that has been created by the learning device using the provisional training data is higher than a predetermined value.

12. The inference learning device of claim 1, wherein when data has been input, the inference model can predict changes a prescribed time after an event.

13. An inference learning method, comprising:
inputting image data from an image acquisition device;
for image data that has been obtained continuously in time series from the image acquisition device, making provisional training data by performing the annotation on a plurality of items of data that have been obtained from data that was acquired at a given first time to a second time traced back to a predetermined time;
making data, among the provisional training data, that has a high correlation of causal relationship with the images of the first time, into adopted training data; and
obtaining an inference model by learning using the adopted training data;
wherein image data input to the input device has one of:
metadata, showing that the image data is data having a possibility of being associated with a cause or an effect, attached,
metadata, showing that there is likely to be a cause, is attached to data showing that there is some cause, among image data input by the input device, or
metadata, showing that there is likely to be a second effect resulting from the first effect, is attached to data showing the first effect based on some cause, among image data input by the input device.

14. The inference learning method of claim 13, wherein the inference model is input with the image data, and it is made possible to output guidance information with which it is possible to guide actions of a user at the time of displaying the image data.

15. The inference learning method of claim 13, wherein when creating the training data, the annotation is made different based on image appearance change for a time that is continuous to the first time.

* * * * *